United States Patent
McGann et al.

(10) Patent No.: US 9,635,181 B1
(45) Date of Patent: Apr. 25, 2017

(54) OPTIMIZED ROUTING OF INTERACTIONS TO CONTACT CENTER AGENTS BASED ON MACHINE LEARNING

(71) Applicant: Genesys Telecommunications Laboratories, Inc., Daly City, CA (US)

(72) Inventors: Conor McGann, San Carlos, CA (US); Bharath Aravamudhan, Perungudi (IN); Petr Makagon, San Francisco, CA (US); Herbert Willi Artur Ristock, Walnut Creek, CA (US); Yochai Konig, San Francisco, CA (US); Gregory Duclos, Thornhill (CA); Vyacheslav Zhakov, Burlingame, CA (US); Damjan Pelemis, Toronto (CA)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/887,297

(22) Filed: Oct. 19, 2015

(51) Int. Cl.
H04M 3/00 (2006.01)
H04M 5/00 (2006.01)
H04M 3/523 (2006.01)

(52) U.S. Cl.
CPC ....... *H04M 3/5233* (2013.01); *H04M 3/5232* (2013.01); *H04M 3/5238* (2013.01); *H04M 2203/40* (2013.01); *H04M 2203/401* (2013.01)

(58) Field of Classification Search
CPC ....... G10L 15/00; G06Q 10/06; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938;
(Continued)

(56) References Cited

U.S. PATENT DOCUMENTS 6,556,671 B1 4/2003 Beauvois
6,584,192 B1 6/2003 Agusta
(Continued)

FOREIGN PATENT DOCUMENTS

EP 1114388 A4 9/2005

OTHER PUBLICATIONS

"Assignment Problem", https://en.wikipedia.org/wiki/Assignment_problem, last modified on Sep. 29, 2015, 3 pages.
(Continued)

*Primary Examiner* — Khai N Nguyen
(74) *Attorney, Agent, or Firm* — Lewis Roca Rothgerber Christie LLP

(57) ABSTRACT

A system that is adapted to route interactions to contact center agents. More specifically, the system is adapted to identify an interaction to be routed, and identify a group of agents based on one or more constraints for generating one or more candidate agents. The system is also adapted to gather context data surrounding the candidate agents. For each agent of the candidate agents, the system is adapted to estimate an expected value to be obtained by routing the interaction to the agent. The system is further adapted to select a particular agent of the candidate agents based on the estimates, and signal a routing device for routing the interaction to the particular agent.

16 Claims, 16 Drawing Sheets

(58) Field of Classification Search
CPC .. H04M 3/42221; H04M 3/51; H04M 3/5166;
H04M 3/5175; H04M 3/5183; H04M
3/5191; H04M 3/523; H04M 3/5231;
H04M 3/5232; H04M 3/5233; H04M
3/5235; H04M 3/5237; H04M 3/5238;
H04M 2203/2011; H04M 2203/2061;
H04M 2242/00; H04M 2242/08; H04M
2242/12
USPC ............ 379/210.01, 265.01, 265.02, 265.03,
379/265.04, 265.05, 265.06, 265.07,
379/265.08, 265.09, 265.1, 265.11,
379/265.12, 265.13, 265.14, 266.01,
379/266.02, 266.03, 266.04, 266.05,
379/266.06, 266.07, 266.08, 266.09,
379/266.1
See application file for complete search history.

(56) References Cited

U.S. PATENT DOCUMENTS

| | | | |
|---|---|---|---|
| 6,963,826 B2 * | 11/2005 | Hanaman | G06F 17/30592 |
| | | | 703/2 |
| 7,269,253 B1 | 9/2007 | Wu et al. | |
| 7,321,298 B2 | 1/2008 | Judkins et al. | |
| 7,373,410 B2 | 5/2008 | Monza et al. | |
| 7,430,523 B1 | 9/2008 | Khalidi | |
| 7,792,773 B2 | 9/2010 | McCord et al. | |
| 8,300,798 B1 | 10/2012 | Wu et al. | |
| 8,761,380 B2 | 6/2014 | Kohler et al. | |
| 8,767,948 B1 | 7/2014 | Riahi et al. | |
| 8,861,710 B2 | 10/2014 | Nimmagadda | |
| 8,891,754 B2 | 11/2014 | Conway et al. | |
| 9,154,626 B2 | 10/2015 | Uba et al. | |
| 9,154,627 B2 | 10/2015 | Placiakis et al. | |
| 9,172,810 B2 | 10/2015 | McCormack et al. | |
| 9,392,115 B2 | 7/2016 | Ristock et al. | |
| 2001/0011228 A1 | 8/2001 | Shenkman | |
| 2002/0049642 A1 | 4/2002 | Moderegger et al. | |
| 2002/0087393 A1 | 7/2002 | Philonenko | |
| 2003/0130927 A1 | 7/2003 | Kellam et al. | |
| 2004/0254850 A1 | 12/2004 | Head | |
| 2005/0060244 A1 | 3/2005 | Goolkasian et al. | |
| 2006/0182258 A1 | 8/2006 | Sisselman et al. | |
| 2006/0245580 A1 * | 11/2006 | Hein | H04M 3/5233 |
| | | | 379/265.12 |
| 2009/0122972 A1 | 5/2009 | Kaufman et al. | |
| 2009/0171752 A1 | 7/2009 | Galvin et al. | |
| 2011/0208522 A1 | 8/2011 | Pereg et al. | |
| 2012/0051536 A1 * | 3/2012 | Chishti | H04M 3/5175 |
| | | | 379/265.06 |
| 2012/0101865 A1 | 4/2012 | Zhakov | |
| 2012/0246020 A1 | 9/2012 | Kersten et al. | |
| 2012/0284038 A1 | 11/2012 | Davis | |
| 2013/0030854 A1 | 1/2013 | McCormack et al. | |
| 2013/0142322 A1 * | 6/2013 | Grasso | G06Q 10/06398 |
| | | | 379/265.08 |
| 2013/0144746 A1 | 6/2013 | Phung | |
| 2013/0223619 A1 | 8/2013 | Kohler et al. | |
| 2014/0079210 A1 | 3/2014 | Kohler et al. | |
| 2014/0086404 A1 * | 3/2014 | Chishti | H04M 3/5232 |
| | | | 379/265.12 |
| 2014/0140494 A1 | 5/2014 | Zhakov | |
| 2014/0140495 A1 | 5/2014 | Ristock et al. | |
| 2014/0140498 A1 | 5/2014 | Mezhibovsky et al. | |
| 2014/0143018 A1 | 5/2014 | Nies et al. | |
| 2014/0146961 A1 | 5/2014 | Ristock et al. | |
| 2014/0153709 A1 | 6/2014 | Byrd et al. | |
| 2014/0249873 A1 | 9/2014 | Stephan et al. | |
| 2014/0270138 A1 | 9/2014 | Uba et al. | |
| 2014/0294172 A1 | 10/2014 | Conway et al. | |
| 2014/0355749 A1 | 12/2014 | Conway et al. | |
| 2015/0003604 A1 | 1/2015 | McCormack et al. | |
| 2015/0030152 A1 | 1/2015 | Waxman et al. | |
| 2015/0103999 A1 | 4/2015 | Nowak et al. | |
| 2015/0117632 A1 | 4/2015 | Konig et al. | |
| 2015/0178371 A1 | 6/2015 | Seth et al. | |
| 2015/0189088 A1 | 7/2015 | Surridge et al. | |
| 2015/0195405 A1 | 7/2015 | McCormack et al. | |
| 2015/0215463 A1 | 7/2015 | Shaffer et al. | |
| 2015/0281448 A1 | 10/2015 | Putra et al. | |
| 2016/0005053 A1 | 1/2016 | Klima et al. | |
| 2016/0006871 A1 | 1/2016 | O'Connor et al. | |

OTHER PUBLICATIONS

"Hungarian Algorithm", https://en.wikipedia.org/wiki/Hungarian_algorithm, 5 pages, last modified on Jun. 14, 2015.
"Slowly Changing Dimension", https://en.wikipedia.org/wiki/Slowly_changing_dimension, last modified Sep. 18, 2015, 6 pages.
Agarwal, Alekh, et al., Taming the Monster: A Fast and Simple Algorithm for Contextual Bandits, Oct. 15, 2014, 30 pages.
Bandanidiyuru, Ashwinkumar, et al., Resourceful Contextual Bandits, JMLR: Workshop and Conference Proceedings, vol. 35, 2014, 26 pages.
Dixon, Matthew, et al., Stop Trying to Delight your Customers, Jul.-Aug. 2010, 9 pages.
https://en.wikipedia.org/wiki/Common_Warehouse_Metamodel, 4 pages, Nov. 19, 2014, 4 pages.
https://en.wikipedia.org/wiki/w/index.php?title=Data_warehouse&oldid=665004558, Jun. 30, 2015, 7 pages.
Konstan, Joseph, Introduction to Recommender Systems, Jun. 10, 2008, SIGMOD, pp. 1-111.
Liu, Bing, Sentiment Analysis and Opinion Mining, Aug. 8, 2011, Morgan & Claypool Publishers, pp. 3-198.
Skyrms, Brian, et al., A Dynamic Model of Social Network Formation, PNAS, vol. 97, No. 16, Aug. 1, 2000, 7 pages.
Wei Chu, Lihong Li, et al., A Contextual-Bandit Approach to Personalized News Article Recommendation, Raleigh, NC, Apr. 26-30, 2010, 10 pages.
Market Wired, Newly-Patented Demographic Capabilities Supercharge Mattersight's Call Routing Technology, Sep. 13, 2016, https://sg.finance.yahoo.com/news/newly-patented-demographic-capabilities-supercharge-131500727.html, 2 pages.
International Search Report and Written Opinion for Application No. PCT/US2016/057560, mailed Jan. 18, 2017, 23 pages.

* cited by examiner

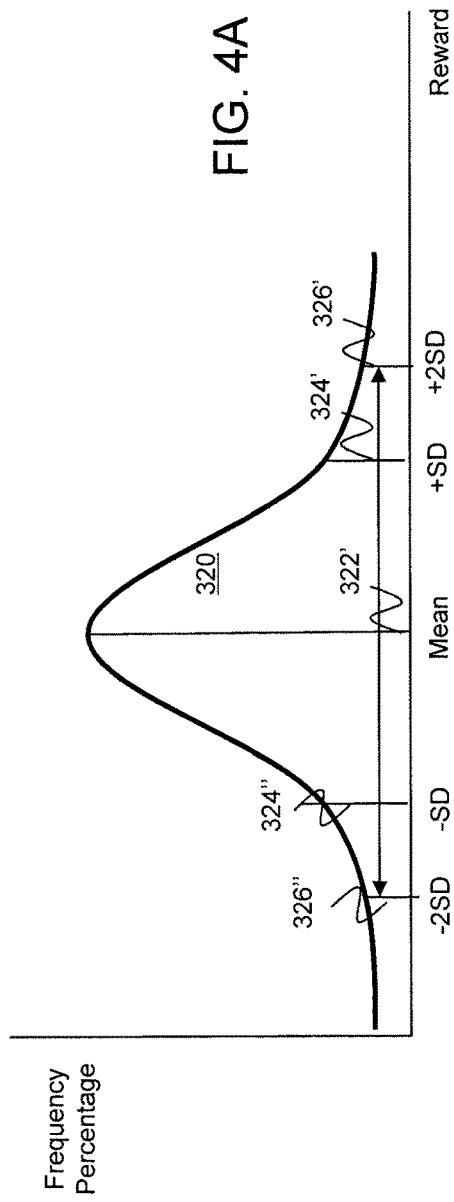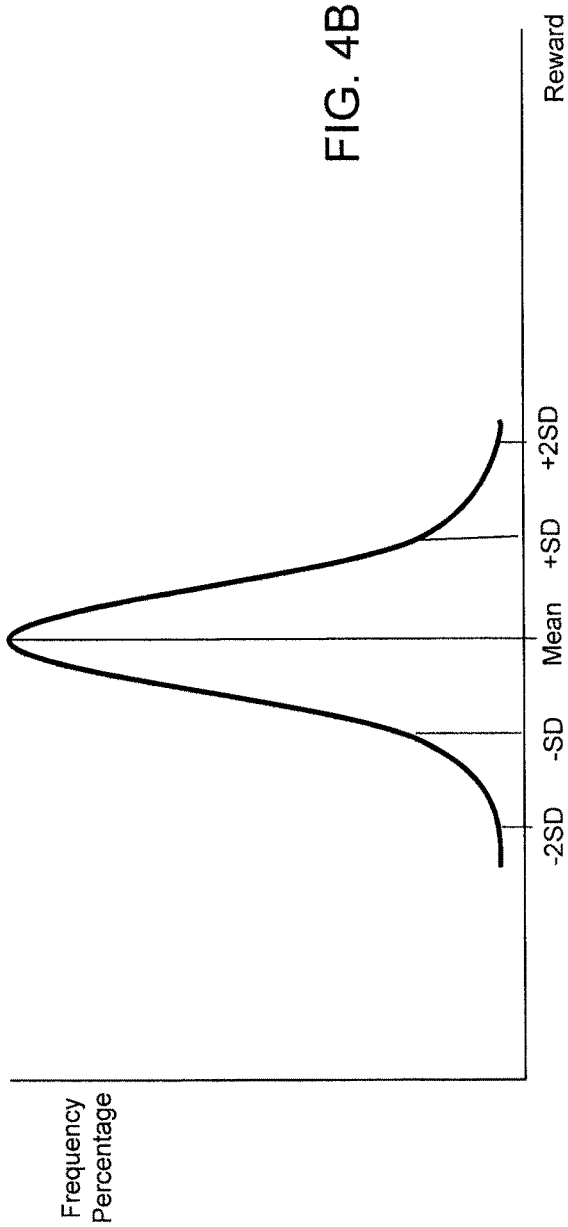

OC Call Reason Distribution — Edit ☐ ☒  600

| Category ⇅ | Percent of Calls ⇅ | | Calls ⇅ | Avg. Duration ⇅ |
|---|---|---|---|---|
| Billing Issue | 40.7% | ☑ | 1522 | 40:33 |
| Equipment Issue | 29.8% | ☑ | 1113 | 42:21 |
| Make Payment | 27.4% | ☑ | 1023 | 41:10 |
| Account Balance | 24.7% | ☑ | 923 | 42:59 |
| Network Issue | 21.5% | ☑ | 805 | 41:05 |
| Activation | 12.5% | ☑ | 466 | 39:45 |
| Voicemail | 11.4% | ☑ | 426 | 36:19 |
| Lost and Stolen | 10.2% | ☑ | 380 | 43:38 |
| Messaging | 9.3% | ☑ | 349 | 39:47 |
| Downloads | 8.9% | ☑ | 332 | 40:05 |
| Wireless Web | 8.2% | ☑ | 306 | 40:13 |
| Payment Option | 6.3% | ☑ | 237 | 44:18 |
| Cancel Account | 5.6% | ☑ | 208 | 41:02 |
| Extended Warranty | 5.4% | ☑ | 200 | 39:56 |
| Restrict Service | 4.6% | ☑ | 172 | 36:26 |
| Update Account | 2.1% | ☑ | 78 | 39:43 |
| Spending Limit | 2.0% | ☑ | 73 | 37:48 |
| Fee Adjustment | 1.6% | ☑ | 60 | 45:15 |
| Summary | 89.3% | | 3338 | 38:39 |

602    604    606    608

*Summary / Reasons (administrator)*

FIG. 6

| Caller Intention | Agent A1 | Agent A2 |
|---|---|---|
| *Enquire_Bill* | 0.3 | 0.4 |
| *Report_Fault* | 0.35 | 1.0 |

FIG. 12

| Time | Intention | Agent | Reward | Available? | Time Discounted Reward ($\lambda = 0.9$) | Output of Optimal Assignment Algorithm | Routing Decision |
|---|---|---|---|---|---|---|---|
| t=0 | Enquire_Bill | A1 | 0.3 | Y | $0.3 * 0.9^0 = 0.3$ | Enquire_Bill→A1 | Enquire_Bill→A1 |
| | | A2 | 0.4 | N | $0.4 * 0.9^1 = 0.36$ | | |
| | Report_Fault | A1 | 0.35 | Y | $0.35 * 0.9^0 = 0.35$ | Report_Fault→A2 | |
| | | A2 | 1.0 | N | $1.0 * 0.9^1 = 0.9$ | | |
| t=1 | Report_Fault | A2 | 1.0 | Y | $1.0 * 0.9^0 = 1.0$ | Report_Fault→A2 | Report_Fault→A2 |

FIG. 13

OPTIMIZED ROUTING OF INTERACTIONS TO CONTACT CENTER AGENTS BASED ON MACHINE LEARNING

CROSS REFERENCE TO RELATED APPLICATIONS

This application is related to the following U.S. Applications entitled "OPTIMIZED ROUTING OF INTERACTIONS TO CONTACT CENTER AGENTS BASED ON AGENT PREFERENCES," "SYSTEM AND METHOD FOR GENERATING A NETWORK OF CONTACT CENTER AGENTS AND CUSTOMERS FOR OPTIMIZED ROUTING OF INTERACTIONS," and "OPTIMIZED ROUTING OF INTERACTIONS TO CONTACT CENTER AGENTS BASED ON FORECAST AGENT AVAILABILITY AND CUSTOMER PATIENCE," all filed on even date herewith, the content of all of which are included herein by reference.

BACKGROUND

An important aspect to effective contact center operation lies in routing the right customer interactions to the right contact center agent. Such interactions may consist of telephone calls, emails, text messages, chat messages, and the like. Identifying the best agent helps to serve two purposes: (i) provide good experience for the caller; and (ii) reduce cost and/or improve revenue for the business. Customer contact centers (CC) traditionally employ skill-based routing for routing customer interactions. In traditional skill-based routing, the skill of an agent is one of the primary factors considered for determining whether the agent is equipped to deal with a particular interaction. The skill may relate to an agent's language proficiency, sales skill, certification, and the like. In this traditional approach to skill-based routing, explicit skill models are generated for the agents, and the skill models are used along with preset routing strategies for mapping the interactions to the agents.

One drawback to traditional skill-based routing using explicit skill models is that the models are often static and do not dynamically adapt based on real-time changes to the environment. Traditional skill-based matching also often results in a relatively large pool of agents that are deemed to have equivalent skills. Another drawback to traditional skill-based models is that they require manual effort to construct and maintain. Thus, the more refined the skill model, the more costly it is. Accordingly, what is desired is a system and method for matching customer interactions to agents to make those connections more optimal than matching based on traditional skill-based routing alone, where the matching may be done using models that may be constructed and/or maintained with minimized manual effort.

SUMMARY

According to one embodiment, the present invention is directed to a system that is adapted, via a processor and memory that has stored therein instructions, to route interactions to contact center agents. More specifically, the system is adapted to identify an interaction to be routed, and identify a group of agents based on one or more constraints for generating one or more candidate agents. The system is also adapted to gather context data surrounding the candidate agents. For each agent of the candidate agents, the system is adapted to estimate an expected value to be obtained by routing the interaction to the agent. The system is further adapted to select a particular agent of the candidate agents based on the estimates, and signal a routing device for routing the interaction to the particular agent.

According to one embodiment, the one or more constraints are skills for handling the plurality of interactions.

According to one embodiment, the expected value is calculated based on profile of the candidate agents, profile of a customer associated with the interaction, and intent of the interaction.

According to one embodiment, the profile of each of the candidate agents includes a dynamically added skill. The dynamically added skill may be ignored or mapped to another skill, for calculating the expected value.

According to one embodiment, a proficiency level is associated with the skill. The proficiency level may be adjusted based on analysis of call transfers for each of the candidate agents.

According to one embodiment, the profile of the candidate agents includes preference of each of the agents in handling the interaction, and the system is adapted to generate a routing offer to one or more of the candidate agents based on the preference of the corresponding agents.

According to one embodiment, the candidate agents and customers associated with a plurality of interactions are modeled as a network of agents and customers. A connection between a node representing one of the candidate agents and a node representing one of the customers may be indicative of a fit between the one of the candidate agents and the one of the customers.

According to one embodiment, the system is further adapted to determine how well a customer associated with the interaction to be routed fits with the particular agent. In determining fit, the system may be adapted to predict sentiment to be expected during the interaction between the customer and the particular agent.

According to one embodiment, the expected value is modeled as a standard normal distribution with an upper confidence bound, and the system is adapted to select an agent associated with an expected value with the highest upper confidence bound.

According to one embodiment, the selection of the agent associated with the highest upper confidence bound balances exploration and exploitation needs. According to one embodiment, the exploration needs are satisfied by selecting agents that are deemed sub-optimal, and exploitation needs are satisfied by selecting agents that maximize expected values.

According to one embodiment, in selecting the particular agent, the system is adapted to concurrently identify a plurality of interactions waiting to be routed, wherein the plurality of interactions include the interaction to be routed, and select contact center agents for the plurality of interactions.

According to one embodiment, the system is adapted to estimate the expected value to be obtained for routing each of the plurality of interactions to each of the contact center agents.

According to one embodiment, the system is adapted to calculate a predicted wait time associated with each of the contact center agents, wherein the expected value for a particular one of the contact center agents is a function of the predicted wait time for the particular one of the plurality of agents.

According to one embodiment, the interactions are real-time interactions.

These and other features, aspects and advantages of the present invention will be more fully understood when con-

BRIEF DESCRIPTION OF THE DRAWINGS

FIGS. 4A and 4B are graphs of exemplary bell curves modeling reward estimation according to one embodiment of the invention;

FIG. 6 is a conceptual layout diagram of a call distribution table that may be populated by an adaptation module according to one embodiment of the invention;

FIG. 12 is a table of exemplary average performance scores for agents A1 and A2, normalized in the range [0.0, 1.0], from analysis of historical interaction data, according to one embodiment of the invention; and FIG. 13 is a table of exemplary interaction assignments using availability forecast models according to one embodiment of the invention.

DETAILED DESCRIPTION

In general terms, embodiments of the present invention are directed to a system and method for optimized routing of customer interactions (iXn) that is aimed to better meet real-time needs or desires of the contact center, agents, and/or customers, than traditional skill-based routing alone. Such optimized routing should help boost business value, lower costs for the contact center, and/or lower efforts of agents and customers in achieving a desired goal. The optimized routing also brings about technical improvements in the field of telecommunications by allowing more efficient use of technical resources of the contact center such as, for example, automated voice response systems, telecommunication ports, and the like. For example, the optimal routing of customer interactions may increase first call resolution that minimizes repeat calls that use the technical resources of the contact center.

According to one embodiment, optimized routing of customer interactions takes into account one or more of the customer's profile, customer's intent, agent profiles, agent preferences, business goals, customer goals, current interaction data, cross-channel interaction history, contact center statistics, personalities and behaviors of agents and customers, predicted sentiment of the customers, and/or actual agent performance results, to optimally connect the customers and the agents. As feedback is received after an interaction is complete, the system engages in machine learning to improve the routing of future interactions.

Figure 1:
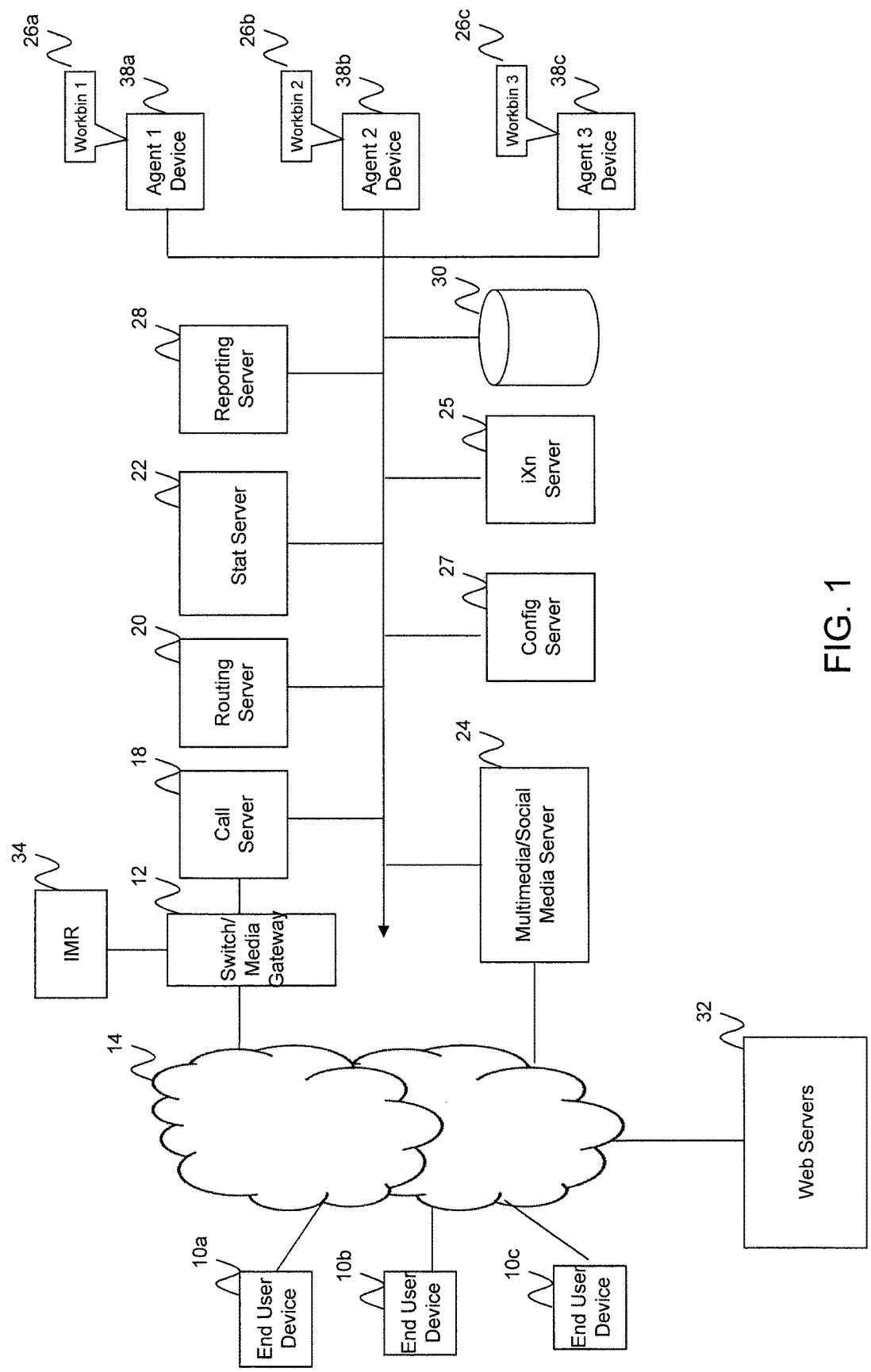
FIG. 1 is a schematic block diagram of a system for supporting a contact center in providing contact center services according to one exemplary embodiment of the invention.

FIG. 1 is a schematic block diagram of a system for supporting a contact center in providing contact center services according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one exemplary embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound telephony calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound telephony calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, or any wireless network/technology conventional in the art, including but to limited to 3G, 4G, LTE, and the like.

According to one exemplary embodiment, the contact center includes a switch/media gateway 12 coupled to the communications network 14 for receiving and transmitting telephony calls between end users and the contact center. The switch/media gateway 12 may include a telephony switch configured to function as a central switch for agent level routing within the center. The switch may be a hardware switching system or a soft switch implemented via software. For example, the switch 12 may include an automatic call distributor, a private branch exchange (PBX), an IP-based software switch, and/or any other switch configured to receive Internet-sourced calls and/or telephone network-sourced calls from a customer, and route those calls to, for example, an agent telephony device. In this example, the switch/media gateway establishes a voice path (not shown) between the calling customer and the agent telephony device, by establishing, for example, a connection between the customer's telephone line and the agent's telephone line.

According to one exemplary embodiment of the invention, the switch is coupled to a call server 18 which may, for example, serve as an adapter or interface between the switch and the remainder of the routing, monitoring, and other call-handling components of the contact center.

The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address, and communicate with other CC components and/or CC iXn server 25 in processing the call.

According to one exemplary embodiment of the invention, the system further includes an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How can I help you?" and the customer may speak or otherwise enter a reason for contacting the contact center. The customer's response may then be used by the routing server 20 to route the call to an appropriate contact center resource.

If the call is to be routed to an agent, the call server 18 interacts with a routing server 20 to find an appropriate agent for processing the call. The selection of an appropriate agent for routing an inbound call may be based, for example, on a routing strategy employed by the routing server 20, and further based on information about agent availability, skills, and other routing parameters provided, for example, by a statistics server 22.

In some embodiments, the routing server 20 may query a customer database, which stores information about existing clients, such as contact information, service level agreement (SLA) requirements, nature of previous customer contacts and actions taken by contact center to resolve any customer issues, and the like. The database may be, for example, Cassandra or any noSQL database, and may be stored in a mass storage device 30. The database may also be a SQL database and may be managed by any database management system such as, for example, Oracle, IBM DB2, Microsoft SQL server, Microsoft Access, PostgreSQL, MySQL, FoxPro, and SQLite. The routing server 20 may query the customer information from the customer database via an ANI or any other information collected by the IMR server 34.

Once an appropriate agent is available to handle a call, a connection is made between the caller and the agent device 38a-38c (collectively referenced as 38) of the identified agent. Collected information about the caller (e.g. via interaction with the IMR server 34) and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The contact center system may also include a multimedia/social media server 24 for engaging in media interactions other than voice interactions with the end user devices 10 and/or web servers 32. The media interactions may be related, for example, to email, vmail (voice mail through email), chat, video, text-messaging, web, social media, co-browsing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction server 25 interacts with the routing server 20 for selecting an appropriate agent to handle the activity. Once assigned to an agent, the activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 30 or elsewhere. The mass storage device may take form of a hard disk or disk array as is conventional in the art.

The contact center system may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center system may further include a configuration server 27 that provides configuration parameters for the various resources of the contact center system. For example, agent profile data for a particular agent may be retrieved from the configuration server 27 when the agent logs into the system. The configuration server 27 may also provide attribute values for other objects or processes used by the contact center system as the objects or processes are created, at system startup, or subsequently.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 2:
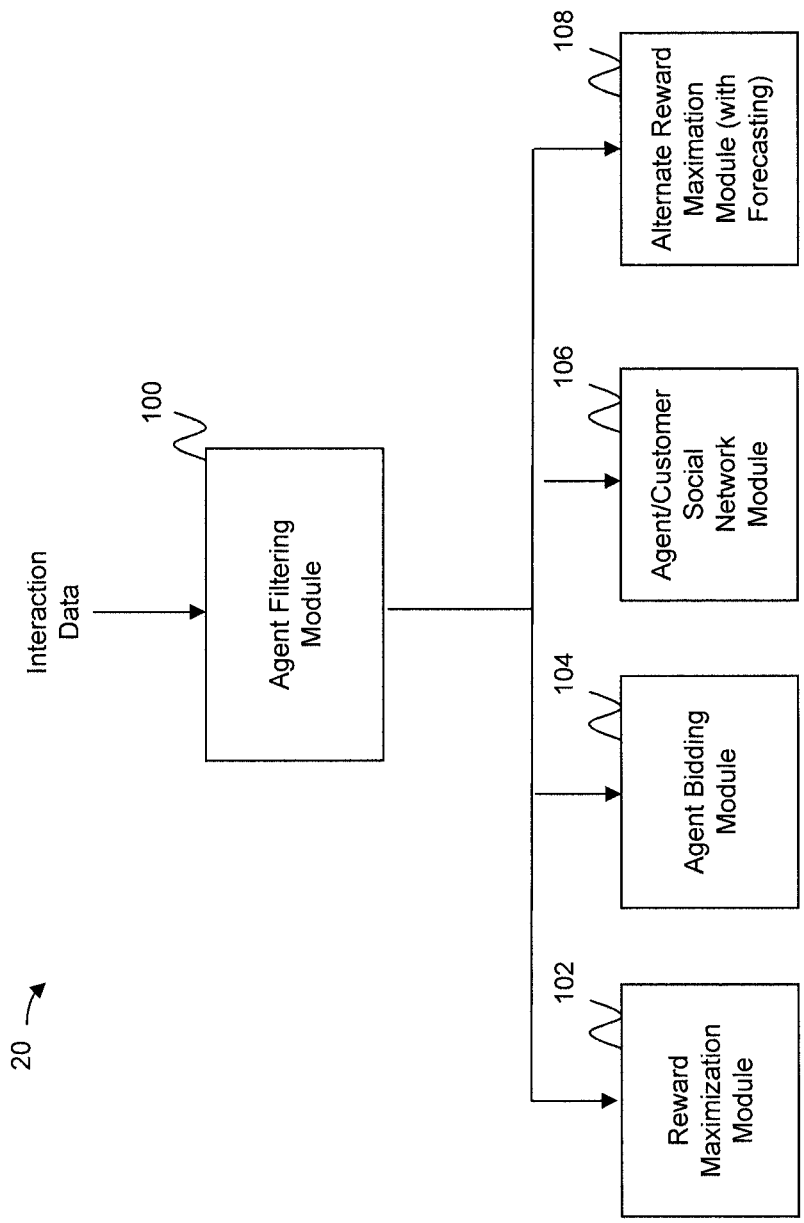
FIG. 2 is a more detailed block diagram of a routing server of FIG. 1 according to one embodiment of the invention.

FIG. 2 is a more detailed block diagram of the routing server 20 according to one embodiment of the invention. According to the embodiment of FIG. 2, the finding of optimal agents for handling customer interactions may be performed in two passes. During a first pass, an agent filtering module 100 filters agents based on hard constraints. A hard constraint may be one that an agent must satisfy in order to be considered as a viable agent for a current interaction. Hard constraints according to one example include agent availability and agent skills. According to this example, an agent must be available and must meet minimum required skills for dealing with the interaction in order to be included as a viable agent. There may be other hard constraints as will be apparent to a person of skill in the art, such as, for example, certification requirements, gender, language proficiency, labor requirements, trading/licensing regulations, workforce management rules for utilization, customer preferences such a "last agent routing," training on the job assignments, and the like.

During a second pass, one or more data-driven optimization modules 102-108 further reduce the agents identified during the first pass, for ultimately selecting one or more agents that are to handle a pending interaction. Exemplary data-driven optimization modules include but are not limited to a reward maximization module 102, agent bidding module 104, agent/customer social network module 106, and alternate reward maximization module 108. These modules may be invoked by the routing strategy after the initial set of agents is identified by the agent filtering module 100.

Although the block diagram of FIG. 2 assumes a 2-step approach in finding an optimal agent, a person of skill in the art should recognize that the functionality of the agent filtering module 100 may be combined into one or more of the optimization modules 102-108, and/or the goal or results of the agent filtering module 100 may be achieved by one or more of the optimization modules via algorithms run by the modules as will be apparent to a person of skill in the art. For example, the hard constraints to be met in selecting agents by the agent filtering module 100 may be considered as another dimension to be met by the algorithms run by the modules. According to such an embodiment, agents may not need to be statically segmented based on queues, service types, and customer segments. Instead, according to this embodiment, interactions are routed to agents that are adept in handling a particular topic without being restricted to the segments to which they would have traditionally been rigidly assigned.

In a similar manner, the 2-step approach of FIG. 2 may further be extended to a 3 (or more) step approach where one of the optimization modules 102-108 further filter the list of candidate agents provided by the agent filtering module 100 to provide a more refined list of candidate agents to another one of the optimization modules 102-108.

According to the embodiment of FIG. 2, it is possible that multiple interactions might be processed by the system simultaneously, causing a selection of routing targets from the same pool of agents. This might lead to race conditions where an agent within the pool of filtered routing targets for one process will be selected by another process as the actual routing target. One way to mitigate this is to apply advanced/intelligent agent reservation policies which temporarily block other routing processes from considering an agent which is in the pool of candidates for a given routing process. In one embodiment, the agent reservation policy may be adapted to tolerate one process stealing an agent that has been reserved. For example, the reservation policy may be configured to rank the various processes so as to allow a higher ranked process to steal an agent that is reserved for a lower ranked process. Another option is an integrated complex routing process for many-to-many interactions to agents routing, where conflicts are resolved internally.

Also, although not shown in FIG. 2, an arbitration module may be coupled to one or more of the data-driven optimization modules 102-108 in order to resolve conflicts. For example, although a particular agent may be deemed to be an optimal agent at the end of the second pass, the agent may have a different (or even conflicting) preference, or it may be desirable to select a second-best agent instead of the optimal agent, such as, for example, for training purposes, or due to other criteria, such as agent occupancy and idle time. That is, it may be desirable to route the interaction to the second-best agent if the second-best agent has been idle for a maximum amount of time, or if the occupancy of the optimal agent is higher than a threshold value.

According to one embodiment, the agent filtering module 100 is configured to run a traditional matching algorithm to filter agents during the first pass based on the identified constraints. For example, if the interaction is an inbound interaction to a particular directory number associated with a service type, the routing strategy for the directory number is retrieved for determining how the interaction should be handled. According to one embodiment, the routing strategy is implemented via SCXML code.

The routing strategy for a telephony interaction may indicate that the interaction is to be initially routed to the IMR 34 for determining the customer intent (e.g. the reason for the call) and/or other information about the caller. Based on the gathered information, the routing strategy identifies a desired set of skills for handling the interaction. According to one embodiment, the desired set of skills may be hard-coded into the routing strategy.

The routing server 20 interacts with the statistics server 22 to identity, from a pool of agents who are currently available (or will be soon available), a candidate set of agents having the desired set of skills. The candidate agents identified by the agent filtering module 100 during the first pass are provided to the one or more data-driven optimization modules 102-108 to find an optimal agent for handling the interaction. An agent may be deemed to be optimal from the perspective of the contact center, customer, agent, or combinations thereof.

According to one embodiment, the reward maximization module 102 is configured, during the second pass, to provide long term optimization of an objective function that the contact center cares about. The objective function may be represented as a weighted sum of desired business outcomes, goals, rewards, or payoffs (collectively referred to as "reward" or "expected value"). In general terms, the reward maximization module 102 is configured to maximize the objective function subject to constraints. Specifically, according to one embodiment, the reward maximization module 102 is configured to select agents for a particular interaction so as to maximize the long term reward while balancing exploration and exploitation needs. In this regard, the reward maximization module 102 selects optimal agents for a particular interaction based on contextual information about agents, customers, and intent. Feedback is received at any time after completion of an interaction. For example, the reward may be completion of a sale (which is noted by an order management system), and may come at a later time after the agent interaction has been completed. The feedback is used by the reward maximization module 102 for reinforcement learning to adapt the agent selection strategy to maximize the reward. The feedback may be the actual reward that was achieved during the interaction.

According to one embodiment, the reinforcement learning algorithm that is employed by the reward maximization module includes explicit policies that balance agent selections for exploration versus exploitation. Exploitation in the context of reinforcement learning may involve choosing an agent (a known model) with the highest average reward for a given intention while exploration may involve choosing a new/random agent to possibly do better. According to one embodiment, the reinforcement learning algorithm that is employed is LinUCB. LinUCB explicitly models the reward estimation within a confidence bound, and allows for selection of agents that might do better within some tolerable limit, rather than the one with the best expected reward.

The agent bidding module 104 is configured to take into account preferences of agents in the routing determination during the second pass. In this regard, while the agent filtering module 100 may be deemed to select interaction-optimal agents due to the fact that the module takes into account preferences/needs of callers and/or interactions in selecting the agents, the agent bidding module may be deemed to select agent-optimal interactions due to the fact that the module takes into account preferences/needs of the agents.

The agent/customer social network module 106 creates a match of agents to customers within a framework of a social network of customers and agents during the second pass. The routing of interactions is used as one mechanism to connect agents and customers. Profiles and other features of both agents and customers may also be used for making the connection. According to one embodiment, the connections are evaluated for determining a fit between an agent and a customer, and an agent with the best fit is selected for handling an interaction from the customer. The determination of fit may be based on predictions as to sentiment of a customer for each agent. Sentiment for the current interaction may be predicted based on sentiment that resulted in prior interactions that may have involved other customers and other agents.

In another embodiment of reward maximization, the alternate reward maximization module 108 is configured to concurrently evaluate multiple interactions that are to be routed over the candidate agents returned by the agent filtering module 100 instead of considering a single interaction in a queue and routing that interaction to an agent before proceeding to consider another interaction in the queue. In doing so, the alternate reward maximization module 108 is configured to select optimal agents that are expected to maximize a total amount of reward achieved by the assignment of the multiple interactions. In this regard, the alternate reward maximization module 108 uses insight on customer patience as well as forecasted availability of agents that are currently unavailable to defer routing of one or more interactions if the deferring will maximize the total reward that is expected to be achieved for all of the interactions. According to one embodiment, the expected value of the reward in assigning the interaction to an agent that is not currently available is discounted by a discount factor that is based on an amount of time that the customer would have to wait to get assigned to that agent.

Although the various optimization modules 102-108 are assumed to be separate functional units, a person of skill in the art will recognize that the functionality of the modules may be combined or integrated into a single module, or further subdivided into further sub-modules, without departing from the spirit of the invention. Also, the various modules 102-108 may be invoked concurrently, in parallel, or alternatively from one another. In addition, although the various modules are indicated as being part of the routing server 20, a person of skill in the art should appreciate that one or more of the modules may be part of other servers provided by the contact center system.

The two pass mechanism for selecting optimal agents may not be a service that is provided to all customers. Rather, the service may be selectively provided based on factors such as customer segmentation. For example, the service may be provided to gold customers but not to silver or bronze customers. The two pass mechanism may also not result in selection of agents in certain circumstances such as, for example, when no agents are available. In this case, the routing server might be configured to wait for a particular amount of time and try again. If agents are still not available, the routing server 20 may be configured to invoke an overflow logic to expand the search criteria. The overflow logic may employ all or certain aspects of the optimization modules 102-108.

Agent Assignment Based on Reward/Value Maximization

Figure 3:
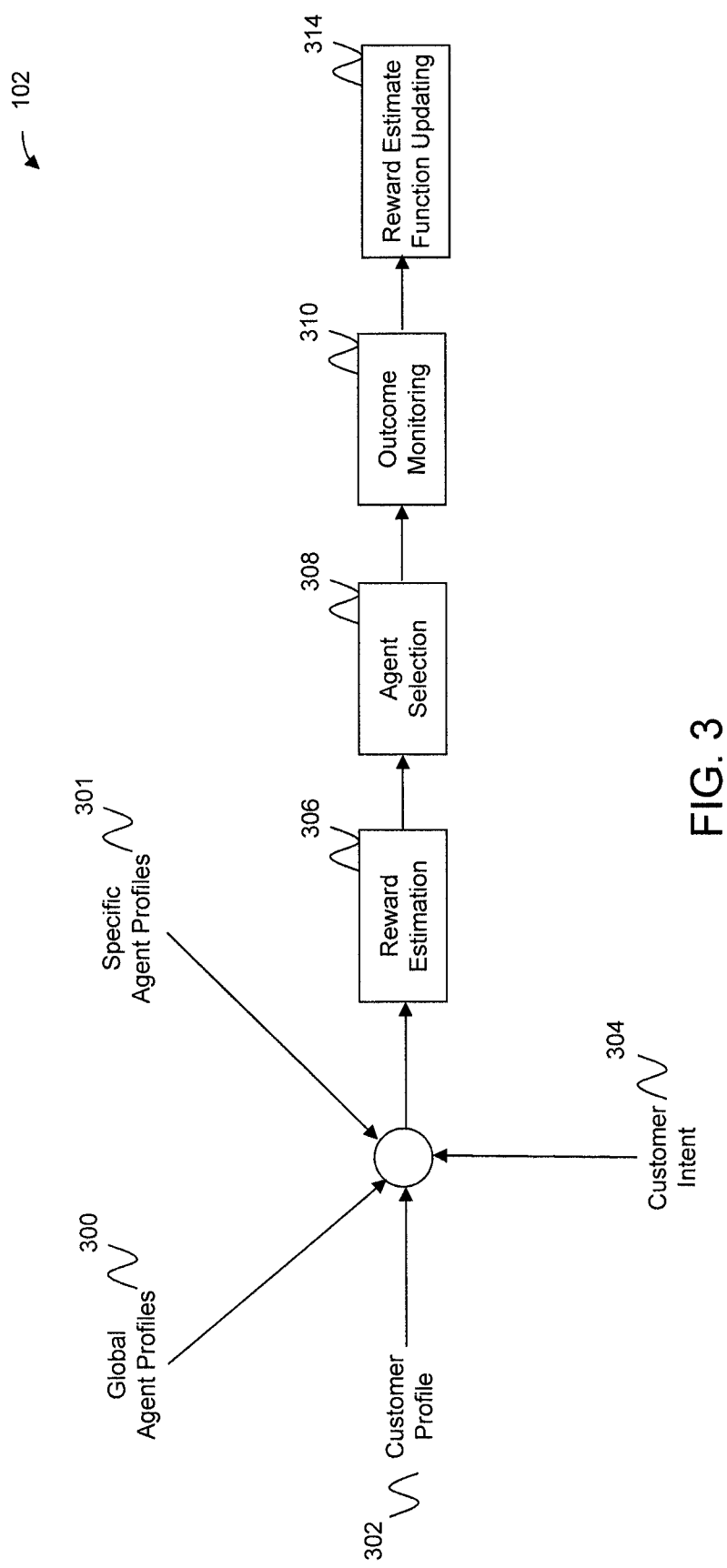
FIG. 3 is a schematic layout diagram of a reward maximization module of FIG. 2 according to one embodiment of the invention.

FIG. 3 is a schematic layout diagram of the reward maximization module 102 according to one embodiment of the invention. The reward (also referred to as value) maximization module 102 takes as input various observations about the environment (also referred to as context), including, but not limited to, global agent profile data 300 and specific agent profile data 301 for agents selected by the agent filtering module 100, customer profile data 302 for a customer associated with the interaction to be routed, and customer intent data 304. The various observations may be represented as a multi-dimensional feature vector.

According to one embodiment, the gathered observations are input to a reward estimation function 306. The reward estimation function estimates, for each of the candidate agents, a reward or expected value that is anticipated to be obtained by routing the interaction to the agent. In this regard, the reward estimation function 306 is configured to take advantage of knowledge of how an agent's performance (reward) varies for different contexts in order to predict the reward for an agent for a given context, and select agents such that the total reward obtained by the system in the long run is maximized. In the attempt to maximize value in the long run, seemingly sub-optimal choices are made in the short run, which is referred to as exploration. For example, assume that there are two agents A1 and A2 are shortlisted for a given context, and the estimated reward for selecting A1 is 0.7 and the estimated reward for selecting A2 is 0.1. If the system routes calls to only A1 and never to A2 (i.e. only 'exploits' what it knows), then another agent (e.g. a new agent A3 that joins the team) may never be selected even though there is a possibility that he might be a better choice with a reward higher than that of A1. On the flip side, if the system always randomly selects an agent (referred to as exploration) without making use of what we know from the past, rewards may not be maximized. In order to overcome this, the algorithm that is used according one embodiment of the invention is aimed to balance both exploitation and exploration needs. One such algorithm that may be used is the LinUCB algorithm.

According to one embodiment, the problem of agent selection for long term reward maximization may be formulated as a reinforcement learning problem such as, for example, the "contextual bandits" problem, or more specifically, a k-armed contextual bandit problem known by those of skill in the art. The context or observation includes information on customers, agents, and interactions; the action is the selection of an agent to whom an interaction is to be routed; and the reward is feedback from the environment on completion of the interaction (e.g. value of an achieved goal).

An observation, O, may be represented as a tuple: ((cp, ci, ap, a), r), where:

1. cp represents the customer profile data 302 defined as a set of key/value pairs which is configured to reflect features available about the customer that are independent of the specific interaction. Exemplary customer profile data include but are not limited to age, gender, language, location, product purchases, affinities, contact into (address, phone, email, social ID), Klout score, business relevant info (family status, hobbies, occupation, memberships, etc.), and the like.

2. ci represents the customer intent data 304 defined as a set of key/value pairs. For example, an intent key value pair may be represented as: intent='disputing bill'.

3. ap represents the global agent profile 300 defined as a set of key/value pairs which is configured to reflect attributes of agents that may be shared by other agents (hereinafter referred to as global attributes). Such global attributes may include, for example, gender, age, language, skills proficiency, and the like. The key/value pair for a gender attribute may be represented, for example, as: gender='female.' In one embodiment, capturing global attributes for specific agents allows the learned information to be transferred across other agents for transfer learning. In this regard, the reward maximization module 102 is configured to build a global agent model for agents based on the global attributes for learning patterns for agents that share the global attributes. For example, the global agent model may reflect a gender age inversion where interactions from older man provide better results when handled by younger female agents.

4. a is an actual agent identifier for retrieving the specific agent profile 301 which is configured to reflect personal attributes for the agent that may not be explicitly captured by their profile, but that may differentiate his performance. Such personal attributes include, but are not limited to patience, diplomacy, hobbies, and other attributes that are not exposed by the system as the agent's profile data. In one embodiment, capturing personal attribute data for specific agents allows the reward maximization module 102 to build a model for just the agent, also referred to as a disjoint agent model, for learning patterns for the specific agent. For example, the model for a specific agent "Mary" may indicate that she is better in handling one type of task than another, or that she is better in handling certain types of customers than other agents (e.g. irritated customers).

5. r is a reward that is obtained as an explicit signal from the environment, on completion of the interaction with the customer. The reward may be, for example, fulfilling a business goal including, but not limited to, achieving a desired customer satisfaction, sales revenue, customer effort score, agent effort score, net promoter score (NPS), and/or any other observable outcome obtained at the end of an interaction. For example, the outcome might be provided as part of a customer survey, sales data, and the like.

In general terms, a solution to the contextual bandit problem has two parts:

1. Learn the relationship between contexts and rewards, for a specific agent (disjoint) or all the agents put together (global); and 2. A strategy for the exploitation vs. exploration tradeoff.

Part 1 is a supervised learning problem which may be solved via algorithms known in the art. In this regard, in part 1 of the strategy, training data is analyzed to produce an inferred function which may be used for mapping new data. According to one embodiment, a linear regression algorithm may be used for the supervised learning.

For Part 2, a reinforcement learning algorithm, such as, for example, the Upper Confidence Bound (UCB) algorithm may be used.

According to one embodiment, the algorithm that is employed by the reward estimation function 306 is referred to as LinUCB, which mathematically combines the two algorithms (linear regression and UCB) and provides a closed form solution that is easy to implement. Although LinUCB is used as one example, a person of skill in the art should appreciate that other algorithms may also be used such as, for example, Randomized UCB, epsilon-greedy, and the like, which are well known by those skilled in the art. For example, if the epsilon-greedy algorithm is used, the algorithm may exploit i.e. choose the best agent 90% of the time, and explore i.e. choose at random agent remaining 10% of the time.

In the embodiment where the reward estimation function 306 is configured to run the LinUCB algorithm, the reward distribution is modeled as a standard normal distribution (also referred to as a bell curve) with upper and lower confidence bounds. The upper confidence bound on the reward may be estimated via the UCB algorithm which is run as part of the LinUCB algorithm. In estimating the upper confidence bound, the algorithm recognizes that the true mean reward value for each agent is not known—only the sample mean value from the rewards collected so far is known. According to one embodiment, the UCB algorithm calculates a confidence interval that captures the uncertainty about the true mean estimate and provides a range of possible values by providing lower and upper confidence bounds.

FIGS. 4A and 4B are graphs of exemplary bell curves modeling the reward estimation according to one embodiment of the invention. The bell curve includes a sample mean value 322' based on observations of rewards obtained so far, and a standard deviation value (SD) that is calculated according to conventional mechanisms. When the standard deviation is large, the curve is short and wide, as depicted in FIG. 4A; when the standard deviation is small (after more observations are made), the curve is tall and narrow, as depicted in FIG. 4B. The confidence interval 320 is the area under the curve. The upper confidence bound may be selected to be a single standard deviation or twice the standard deviation. If twice the standard deviation is used, the confidence interval is 95%, meaning that the interval covers 95% of the area under the bell curve. In other words, there is 95% chance that the true mean is within the range 326' and 326".

On seeing more and more samples (e.g. actual reward values), the standard deviations become smaller and smaller, as depicted in FIG. 4B; hence, the range that encompasses the true mean becomes smaller and smaller. Thus, in the context of reward estimation, by selecting the agent corresponding to the highest upper confidence bound (e.g. upper confidence bound 326') when compared to the upper confidence bound corresponding to other agents for whom reward is estimated, the algorithm selects the agent for whom there is most uncertainty. For example, this could be a new agent for whom the observations are few. The range of the reward estimate for such a new agent is large; resulting in a high upper confidence bound. According to one embodiment, the algorithm continues to select the new agent with the high upper confidence bound until his upper confidence bound is below the upper confidence bound of the more established agents. By doing so, the algorithm engages in exploration of new agents. Once the algorithm has seen enough samples for each agent for whom rewards have been collected, the upper confidence bound for each such agent approaches the true mean value. At this point, by selecting the agent with the maximum upper bound, the algorithm engages in exploiting prior knowledge.

Referring again to FIG. 3, the reward estimation function returns the calculated/estimated reward and the upper confidence bound to an agent selection function 308. According to one embodiment, the agent selection function is configured to select the agent with the maximum upper confidence bound, thereby exploiting prior knowledge. The reward maximization module 108 then proceeds to send a signal to, for example, the call server 18 which then may signal the switch/media gateway 12, to route the interaction to the agent device 38 corresponding to the selected agent. According to one embodiment, the agent selection choice may be over-ruled by some other arbitrating function. As a person of skill in the art should appreciate, the use of the upper confidence bounds automatically trades off between exploitation and exploration. If there is a tie between two agents, the tie is broken arbitrarily according to one embodiment.

According to one embodiment, an outcome of the interaction measured in terms of the reward that is actually achieved by the interaction, is monitored by a monitoring function 310. For example, if a sale resulted from the interaction, the monitoring function captures information surrounding the sale such as, for example, sales price, item, time, and the like. The reward that is obtained is the sales revenue resulting from the sale. The reward may also be a customer satisfaction rating, NPS score, customer effort score, and the like.

The actual reward from the interaction may be provided to an updating function 314 for updating, as needed, the reward estimation function used for the reward estimation. According to one embodiment, a linear regression algorithm is used for learning the reward function based on observed outcomes. The update of the reward function may be done as soon as each outcome is observed, or performed in batch on a periodic basis.

According to one embodiment, the configuration server 27 provides a graphical user interface for access by a contact center administrator for fine-tuning one or more parameters of the reward maximization module 102. For example, the administrator may select one or more rewards to be optimized by the reward maximization module. In one embodiment, the contact center administrator may want to optimize for first call resolution instead of wait time. In this example, customers may be kept waiting a longer time, but are routed to better matching agents.

The parameters may also be automatically refined on a per call basis based on various factors including, for example, caller profile, caller intent, time of day, and the like. Some of the inputs may be pre-fixed and others may be derived. For example, customer intent 304 may be derived from running text analytics algorithms on text in either a voice channel where it was converted to text, or in a text channel. In another example, for a given customer profile, the reward maximization module 102 may determine, based on machine learning, that customers with that profile are more patient, and hence, are willing to wait longer for an agent before the call is abandoned. For example, it may be learned that gold customers are more patient than silver customers. If a particular interaction is thus from a gold customer, the reward estimation function may seek to optimize first call resolution instead of wait time, and route the call to agents that will optimize first call resolution. According to one embodiment, this invokes a wider form of optimal decision making where a pool of interactions and a pool of agents are all evaluated together as discussed in more detail below, where the interactions in the queue are interactions of customers that can hold.

According to one embodiment, the observations that are made by the reward maximization module for estimating a reward are attributes that may change dynamically as the contact center adapts to changes in the real-world. For example, a particular topic (e.g. new iPhone version) may be quite popular at one time but fade away after some passage of time. While the topic is popular, however, the contact center may experience an increase in interactions relating to the popular topic (e.g. 80% of calls relate to some aspect of the new iPhone version). For such popular topics, it may be desirable to dynamically identify sub-topics relating to the main topic in order to more optimally route calls to agents to address specific sub-topics.

According to one embodiment, an adaptation module that may be hosted in any server of the contact center (e.g. configuration server 27, routing server 20, or the like) is configured to observe contact center operations, learn changes in real-life interactions, and dynamically adjust contact center operation accordingly. The adjustment may relate to criteria that is considered by the routing server 20 in finding optimal agents to handle interactions. The criteria may relate, for example, to agent skills that are to be considered for routing. As popularity of the topics wax and wane, the adaptation module may be configured to dynamically add and delete skills and sub-skills for one or more agents (as represented in their global agent profile 300) for dealing with those topics (or not).

In another example, the criteria may relate to customer segmentation (gold, silver or bronze). According to one embodiment, the adaptation module may communicate with the reward maximization module 102 to dynamically reassign to a customer, a particular customer segment that is stored as the customer profile data 302, based on anticipated outcome of the given interaction, as is described in U.S. application Ser. No. 14/450,194, entitled "System And Method For Anticipatory Dynamic Customer Segmentation For A Contact Center," filed on Aug. 1, 2014, the content of which is incorporated herein by reference. For example, customer may be treated as a "gold" customer based on anticipated outcome of the interaction even though the current customer segment for that customer is "silver."

In addition to updating agent skills and/or customer profiles based on observed changes, other dynamic adjustments to contact center operation may also be made based on, for example, popularity of topics. For example, in response to the routing server 20 detecting an influx of calls on a particular topic, a dedicated telephone number that customers may call to inquire about the popular topic may be added for the contact center by the adaptation module, and a routing strategy may be dynamically associated with the route point. In another example, a script run by the IMR server 34 may be dynamically modified by the adaptation module to add options or prompts directed to the popular topic. The additional option may be to connect customers to agents skilled to handle the specific topic as is further described in U.S. application Ser. No. 14/068,959, entitled "System and Method for Performance-Based Routing of Interactions in a Contact Center," filed on Oct. 31, 2013, the content of which is incorporated herein by reference.

Figure 5:
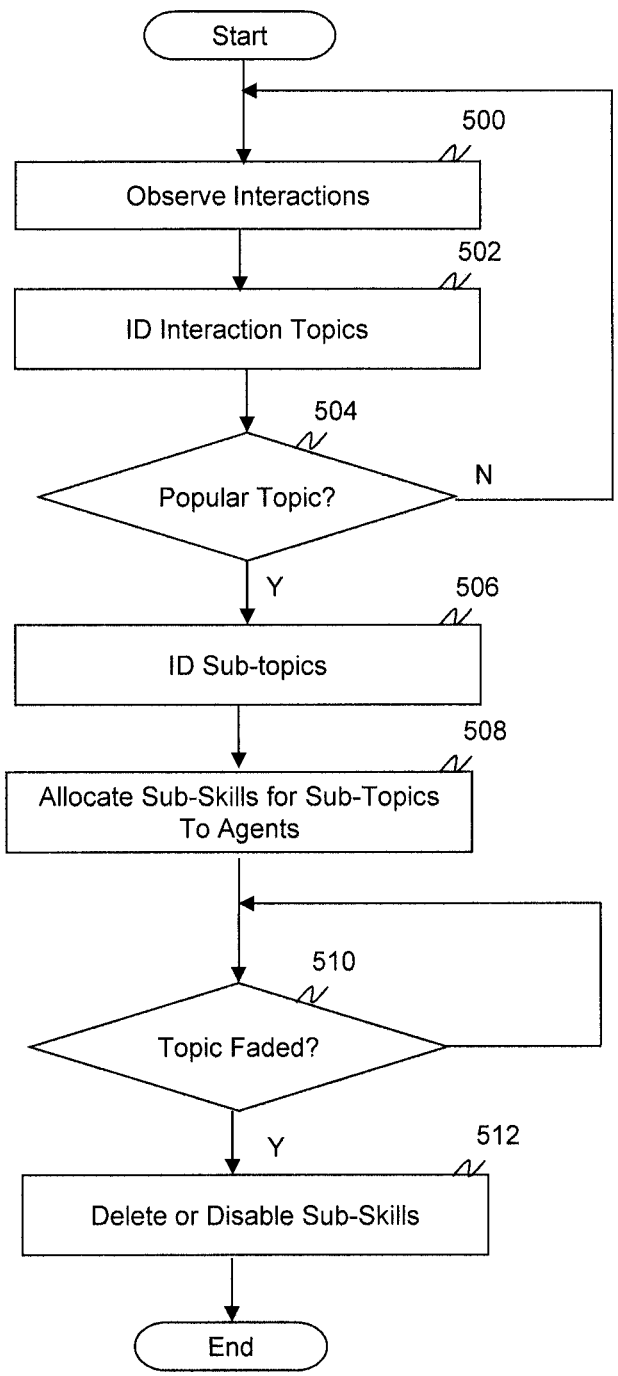
FIG. 5 is a flow diagram of a process executed by an adaptation module for dynamically adjusting contact center operation based on detected changes in real-life interactions according to one embodiment of the invention.

FIG. 5 is a flow diagram of a process executed by the adaptation module for dynamically adjusting contact center operation based on detected changes in real-life interactions according to one embodiment of the invention. In act 500, the adaptation module engages in observation of interactions handled by the contact center. In this regard, the module monitors various data that may be used to deduce explicit or implicit intent of the interactions. Such data may be provided by the IMR 34 upon a customer interacting with the IMR, by a speech analytics engine upon review of speech uttered during an interaction, analysis of text provided during non-voice interactions, and the like. The observations may be conducted in real time with the interactions, after each interaction is complete, or a combination of both.

For example, the speech analytics engine may contain instructions for analyzing audio of real-time or recorded calls, and storing the analysis data in the mass storage device 30. The analysis data may be, for example, classification of calls into predefined categories based on recognition of one or more phrases uttered by a customer. For example, a call may be categorized as having as particular call topic such as, for example, "where is my stuff," based on recognition of phrases such as, for example, "I would like to check the status of my order."

In act 502, the adaptation module identifies the interaction topics for the observed interactions and populates, for example, a call distribution table used to collect a list of different interaction topics deduced from interactions received by the contact center.

FIG. 6 is a conceptual layout diagram of a call distribution table 600 that may be populated by the adaptation module according to one embodiment of the invention. The call distribution table 600 includes a list of interaction topics/categories 602 inferred for the calls received by the call center, a specific agent, a department, or group of agents, during a particular time period. The categories relate to specific interaction topics, such as, for example, billing issue, equipment issue, and the like. The call distribution table 600 further includes a percentage of calls 604, total number of calls 606, and average duration of the calls 608 detected for the particular time period. Other information may also be maintained in the call distribution table, such as, for example, a time period during which the listed call topics where detected, identifiers of agents handling each category, and the like. Also, in addition to main topics, sub-topics for a particular topic may also be identified.

Referring again to FIG. 5, in act 504, a determination is a made as to whether any of the identified interaction topics are deemed to be trending or popular. Popularity may be determined in any manner conventional in the art, such as, for example, based on a percentage interactions that are received at the contact center that relate to a particular topic. If the percentage of those interactions is higher than a threshold amount, the particular topic to which they relate may be flagged as being popular.

If a particular topic is identified as being popular, the module proceeds to identify sub-topics for the popular topic in act 506. The identification of sub-topics helps to add granularity to the skills that may be considered for routing interactions to the appropriate agents. For example, certain sub-topics dealing with a new iPhone version may relate to bending of the phone, how to purchase the phone, battery life, and the like. The generating and identifying of sub-topics may be done via speech recognition and by analyzing and extracting concepts from interactions as is further described in U.S. Pat. No. 7,487,094 entitled "System and Method of Call Classification with Context Modeling," and U.S. application Ser. No. 13/952,459, entitled "System and Method for Discovering and Exploring Concepts," the content both of which are incorporated herein by reference.

In act 508, sub-skills are identified and allocated to agents in the corresponding agent profiles 300 for dealing with the sub-topics. According to one embodiment, the sub-skills may be automatically derived upon engaging in text analysis of emails, chats, and the like, received at the contact center, or analysis of text transcripts of recent voice interactions. The sub-skills may also be suggested by an agent for being added as a sub-skill based on topics that the agent anticipates being relevant in the near future. According to one embodiment, the identified sub-skills are not included as part of the hard-coded routing strategy that is used by the routing server 20 in routing a call. Instead, the sub-skills are identified on the fly and considered by the routing strategy upon invoking of the reward maximization module 102.

In act 510, the adaptation module determines whether the topic has faded. This may be done, for example, by monitoring the interactions and determining, for example, a number of interactions relating to the topic. For example, if no interactions have been received for a period of time in regards to the topic, or if the percentage of interactions relating to the topic fall below a threshold value, it may be determined that the topic has faded.

If a particular topic has faded, the adaptation module proceeds to delete or disable the sub-skills allocated to the agents in act 512. According to one embodiment, the addition and/or removal of sub-skills may be automatic. In other embodiments, the addition and/or removal of the sub-skills does not occur until verified and allowed by an administrator.

The adaptation module may also provide other fluid and de-centralized mechanisms for defining skills of an agent. For example, instead of, or in addition to, any static skills that may be set by a contact center administrator, the agent may also be free to assign skills to himself. In this regard, the adaptation module provides a graphical user interface that is accessible to the agent to view his profile, and dynamically add to this profile, skills that he may want to declare for himself. The declared skills may be reinforced or contradicted based on the outcome of the interactions. For example, if agent that has declared for himself a "mortgage" skill set continuously fails to close mortgage deals, the adaptation module may be configured to remove or decrease a skill level value for the declared skill. If however, the agent has an average rate of closing of mortgage deals, but other agents or customers to whom the agent has connections with endorse the agent for this particular task, the adaptation module may increase the agent's "mortgage" skill level assuming, for example, receipt of at least a threshold number of endorsements. In this regard, a customer may have access to view information on the agents to which he has had an interaction, including the skills of the agents, ratings of the agent (e.g. on a per skill basis), and the like. The information may be available as a social media webpage provided by the adaptation module. In one example, customers may endorse an agent's skill via the social media webpage. According to one embodiment, a first agent may silently monitor a second agent to give the peer endorsement that the second agent may need in order to get an increase in a skill level.

In addition to popularity of call topics for generating or modifying agent skills, agent skills/sub-skills may further be modified based on other learned events such as, for example, call transfers from one agent to another. In this regard, a bank may have a set of agents for handling calls relating to credits cards. However, there are various sub-topics relating to credits where one agent may prove to be more proficient in certain sub-topics than another agent. According to one embodiment, the adaptation module is configured to monitor information surrounding the transfer of calls from one agent to another. In this regard, the adaptation module maintains a call transfer graph where the nodes represent agents and edges represent the direction of transfer as well as the interaction topic. The adaptation module analyzes the call transfer graph from time to time to modify skills for the agent based on the analysis. Any appropriate algorithm used for graph theory may be invoked by the adaptation module for analyzing the call transfer graph and inferring sub-topics that an agent is proficient in (based on calls with sub-topics transferred to the agent), as well as sub-topics that the agent is not proficient in (based on calls with sub-topics that the agent decides to transfer out). The decision to transfer out a call may be given more or less weight as being an indicator of proficiency depending on context surrounding the transfer. For example, agent capacity may be considered when the call was transferred to another agent. If the agent was close to maximum capacity, the transfer may have been due to the agent being too busy, and not necessarily because the agent is not proficient in the topic. Also, the inference that an agent is proficient on a particular sub-topic based on calls having the sub-topic that are transferred-in to the agent may be given more or less weight depending on the actual interaction result. For example, although a particular agent often gets transfers of calls relating to a particular sub-topic, if the agent does not handle those calls to the satisfaction of the customers involved, the agent would not be deemed to be proficient in that particular sub-topic.

Figure 7:
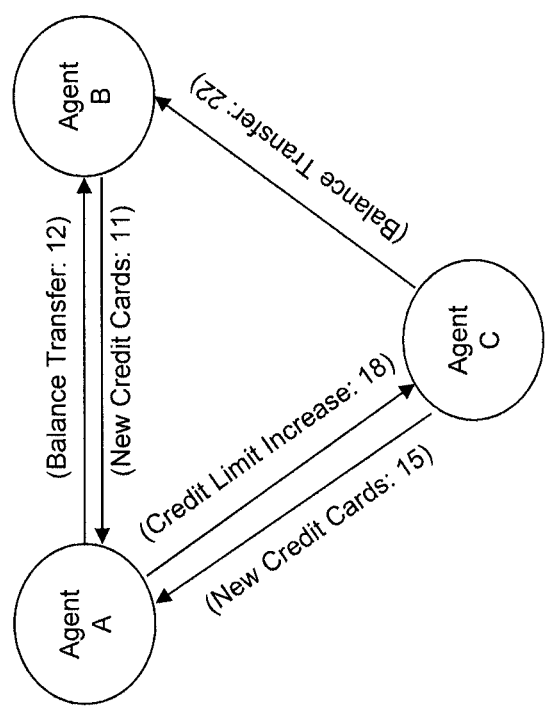
FIG. 7 is an exemplary call transfer graph according to one embodiment of the invention.

FIG. 7 is an exemplary call transfer graph according to one embodiment of the invention. In the illustrated call transfer graph, an inference may be made, by analyzing the graph, that Agent A is proficient with helping customers to open new credit cards as 36 calls with this topic were transferred to Agent A from other agents, but not as proficient in dealing with the topics of credit limit increases and balance transfers since Agent A decided to transfer interactions dealing with these latter topics to respectively Agent C and Agent B. On the other hand, Agent B may be deemed to be proficient with the topic of new credit cards and Agent C may be deemed to be proficient with the topic of credit limit increases based on transferred-in calls dealing with these topics.

According to one embodiment, another attribute of the contact center that may change dynamically is the reward itself. For example, instead of a contact center administrator statically setting one or more desired KPI values as the reward to be maximized, the desired KPI values may change dynamically based on detecting one or more trigger events at the contact center. The monitoring of such trigger events for updating the desired KPI values may occur on a daily basis, hourly basis, or even on an interaction basis. For example, in response to detecting a particular trigger event associated with a current interaction, such as, for example, detecting that the current interaction is associated with a particular customer attribute, a determination may be made that for this current interaction, a first KPI value is more important to be achieved than a second KPI value. Thus, in routing the current interaction, agents predicted to maximize the first KPI value are selected over agents predicted to maximize the second KPI value. According to one embodiment, the reward that is desired to be maximized is exposed to the agents so that the agents may focus on achieving such a reward.

According to one embodiment, attributes of the contact center that are changing may be viewed as fast-changing or slow-changing dimensions. Such attributes may relate to skills and other routing criteria, as well as service types, customer profile, customer segmentation, and the like. According to one embodiment, the attributes of the contact center may be modeled using a contact center metamodel akin to a common warehouse metamodel which will be understood by a person of skill in the art. As with a common warehouse metamodel, the management of the attributes maintained in the contact center metamodel may differ depending on whether the attributes are fast changing or slow changing. For example, the maintaining of historical information may differ depending on whether the attribute is fast changing or slow changing. According to one embodiment, fast changing attributes are removed from the table storing the slowly changing ones into a separate table. In this manner, the table does not get filled up too quickly with historical information on skills that may have been temporarily generated for a popular topic but removed after the popularity of the topic disappears.

Just as reporting is adjusted to fast or slowing changing dimensions in data warehousing, routing may also need to be adjusted. For example, an agent who has a set of skills that have been defined in his agent profile may, over time, acquire new skills, or old skills may become obsolete, causing his skill set to change. Service types may also change over time. For example, a new service type (e.g. "mortgage") may be added for routing purposes in response to the emerging of a new business segment for a company, or two business segments of the company may be combined into one, causing au old service type to become obsolete. Agent preferences of what types of interactions they would like to handle also change over time.

Taking agent skills as an example, as popularity of topics wax and wane, and skills and sub-skills are dynamically added and deleted from the profiles of one or more agents, a current skill set for one of those agents that is considered to predict a current reward may be different from a prior skill set that was relevant in achieving prior rewards. Different mechanisms may be employed to try to exploit the learned correlations of the prior skill set to the achieved rewards, while minimizing the skewing of the current reward prediction. According to one embodiment, a sliding time window may be employed so that, if a particular skill is identified as being a fast changing skill, such fast changing skills and the rewards correlated to such fast changing skills, become obsolete if outside of the sliding time window. In this regard, just as fast changing dimensions may be removed from a table for reporting purposes, fast changing agent skills and associated reward information may be removed/overridden after a short period of time (e.g. after popularity of the topic that caused the new skill or subskill to be generated, fades).

In another embodiment, a fast changing skill that is no longer relevant may be mapped to a skill that is current and relevant. In this regard, the adaptation module may be configured to identify a fast changing skill as being in the same family as another skill. For example, the adaptation module may be configured to assume that an agent who got high scores in supporting customers on questions related to HDD storage solutions could serve also customers on SSD technology. Thus, skills relating to HDD may be deemed to be in the same family as skills related to SDD. The agent's track record for HDD may then be used to judge skills and compute expected rewards of an agent for an interaction relating to SSD.

Although skills is used as an example, a person of skill in the art should recognize that the above mechanisms may be extended to other fast changing attributes.

According to one embodiment, the adaptation module of the configuration serve 27 may further allow a contact center administrator to specifically mark as ephemeral, certain fast changing attributes so that they are given lower or shorter influence in predicting rewards that other attributes. For example, if there is a recall of a particular product X, the contact center administrator may anticipate spikes on calls relating to product X. In order to avoid this particular call intent overpowering other attributes that are considered for predicting rewards, the contact center administrator may expressly signal the reward maximization module 102 (e.g. via a graphical user interface), that this particular call intent is ephemeral. In the example of the recall for product X, the contact center administrator may signal the reward maximization module 102 that a call intent relating to recall of product X should be ignored as being a fast changing attribute that will not be relevant after the recall period is over. The same may apply when there is a campaign that runs for a particular period of time for sale of product Y, and there is a spike of calls relating to product Y during the campaign period. The contact center administrator may signal the reward maximization module 102 to ignore the reward data associated with this call intent during the campaign period.

On a similar token, the contact center administrator may identify certain attributes as having stronger or longer influence on reward prediction than other attributes. For example, if the geographic location of agents is better correlated to customer satisfaction, difficulty of the customer, length of interactions, and/or the like, the contact center administrator may signal the reward maximization module 102 to consider this attribute for a longer period of time (e.g. longer than a year) than other criteria, and/or to give it a stronger weight.

According to one embodiment, a contact center administrator may also want to experiment how separate attributes/criteria affect routing. In this regard, the adaptation module is configured to provide tools that are accessible to the administrator to assign temporary weights to different attributes and run routing in a controlled setting to observe rewards that are achieved in such controlled setting. According to one embodiment, such experiments allow the contact center administrator judge relevance and/or sensitivity of certain criteria. Criteria of no or low impact may be gradually removed for simplification.

Agent Assignment Based on Forecast Agent Availability and Customer Patience

The alternate reward maximization module 108 is configured to extend agent assignment based on maximizing expected values so that instead of evaluating a single interaction over a set of agents, multiple interactions are evaluated concurrently over the set of agents. In general terms, advantage is taken of the insight that customers may be prepared to hold in order to obtain better outcomes, and agent's future availability may be forecast based on prior patterns of interaction, resulting in greater level of flexibility in how interactions may be routed.

To understand the potential of optimization techniques in routing, a toy example may be considered. In this example, it is assumed that customers call for one of two reasons: Enquire_Bill or Report_Fault. There are two agents in the contact center: A1 and A2. While each of them can handle both call types, their performance under a metric (e.g. NPS) varies. FIG. 12 is a table of shows exemplary average performance scores for agents A1 and A2, normalized in the range [0.0, 1.0], from analysis of historical interaction data. As seen in this table, historical data indicates that A2 performs better than A1 for call reason Enquire_Bill while A1 performs better than A2 for call reason Report_Fault.

An assumption is also made for purposes of this example, that the interaction queue currently contains two interactions, one of each type, with the first one being for call reason Enquire_Bill. In a typical skill based routing setup, the interactions in the queue are processed one after another (e.g. FIFO) by assigning each interaction to one of the available agents qualified to handle the call. Traditional routing schemes typically do not have the notion of "performance score" associated with an agent. Thus, in the toy example, such a traditional routing scheme may assign the interaction Enquire_Bill to A2 and Report_Fault to A1, resulting in a total performance score of 0.75 (0.4+0.35).

If a greedy assignment strategy is employed, instead of assigning to any one of available agents, the strategy assigns the interaction to the agent who has the highest performance score for the interaction type. Thus, in assigning the Enquire_Bill interaction, the routing strategy is configured to look at the performance scores of both the agents and choose A2 with the higher score. Thereafter, Report_Fault is assigned to A1, being the only agent available. As a result, the total score is again 0.75 (0.4+0.35).

According to one embodiment, the alternate reward maximization module 108 is configured to use an assignment strategy which, instead of identifying the best agent for a single interaction, considers several (e.g. all) the interactions in the queue and several (e.g. all) of the candidate agents, together as a whole, for maximizing the total expected reward/value. In the above example, the optimization based approach used by the alternate reward maximization module looks at all the possible ways of assignment i.e. (Enquire_Bill→A1, Report_Fault→A2) and (Enquire_Bill→A2, Report_Fault→A1), and chooses the one that results in the maximum expected reward. Thus, the alternate reward maximization module chooses (Enquire_Bill→A1, Report_Fault→A2) as it fetches 1.3 as the total reward, which is greater than 0.75 associated with the other choice.

In maximizing the total expected reward for multiple interactions in the queue, the alternate reward maximization module 108 leverages information on customer patience and forecast agent availability if certain agents are not currently available to receive an interaction assignment. Based on the information, the alternate reward maximization module determines whether it should hold-off routing an interaction to get a more optimal agent assignment. According to one embodiment, the customer patience value is for particular intention type (call intent). The patience value may be a value that is derived/calculated by the alternate reward maximization module based on observed abandonment rates, service times, NPS scores, and the like. For example, information on the impact of caller wait time on the final NPS score may be used to calculate the customer patience number of a call intention type. In this regard, a wait time threshold may be identified for each intention type after which the NPS score drops. For instance, assume that for one of the intention types, it is observed that its Average Handling Time is 619 seconds and average caller Wait Time is 40 seconds (with 70% of the calls answered in less than 1 seconds), and the NPS score drops sharply only after 190 seconds. The customer "patience number" for this intention type may be set as 180 seconds. This example illustrates that customers are prepared to wait (for some time) for the right agent rather than settle for a lesser skilled agent. Therefore, given reliable short term forecasts of agent availability, and an estimate of customer's patience or tolerance level for waiting before abandoning or negatively impacting outcomes, that time flexibility may be exploited to do a more optimal interaction-agent match.

Figure 8:
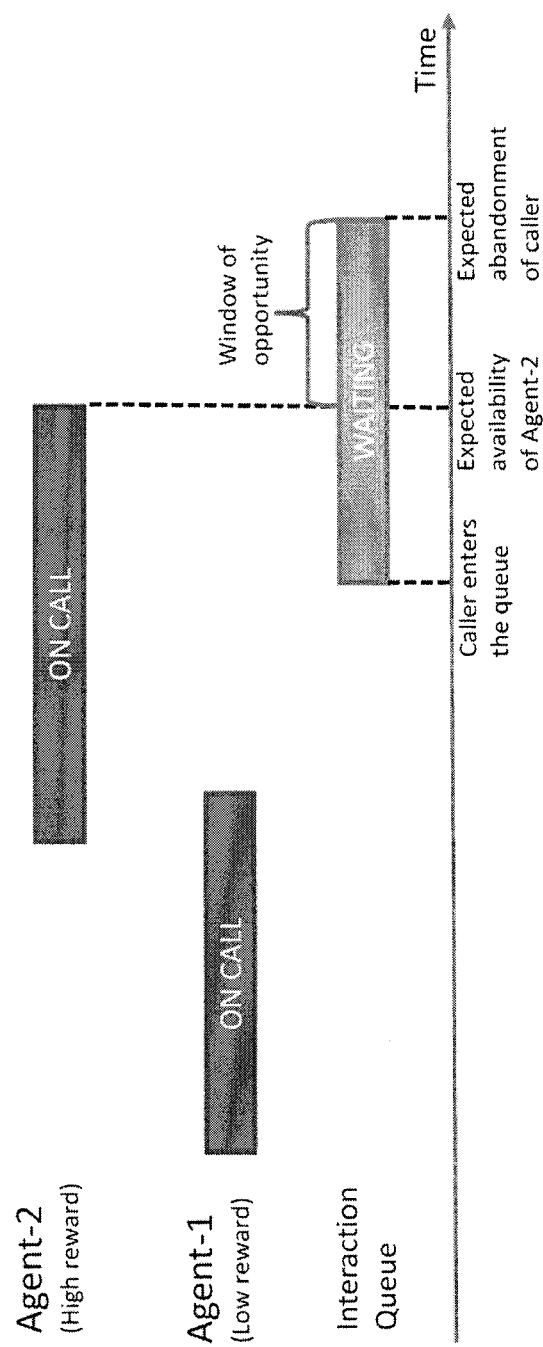
FIG. 8 is a timing diagram showing a window of opportunity that may be exploited by an alternate reward maximization module for a better interaction-agent matching.

FIG. 8 is a timing diagram showing a window of opportunity that may be exploited by the alternate reward maximization module 108 for a better interaction-agent matching. In the example of FIG. 8, although Agent-1 is available when the caller entered the queue, the interaction is not assigned to Agent-1 due to a potential of a low reward compared to the reward that may be achieved by assigning the interaction to Agent 2, who is currently unavailable. Instead, the alternate reward maximization module 108 is configured to wait to assign the interaction to Agent-2 who is expected to fetch higher reward. In the above toy example, suppose A1 is available, and A2 is not available, but would be available in an acceptable time (e.g. within the caller's patience threshold). In that example, the alternate reward maximization module choses a more optimal assignment with a total reward of 1.3, where the Enquire_Bill interaction is assigned to A1, and the Report_Fault interaction is assigned to A2.

According to one embodiment, the algorithm for assignment that may be employed by the alternate reward maximization module 108 assigns higher rewards to agents that are available sooner. According to such algorithm, let:

$r_{ij}$—Expected reward if interaction i is handled by agent j (e.g. the upper confidence bound of the expected reward)

$\lambda$—Discount factor in the range [0.0, 1.0] that may be preset by the contact center; gives more importance to sooner rewards than the later ones.

t—Predicted wait time based on agent's current status and caller's patience level; '−1' if interaction i is likely to be abandoned before agent j becomes available.

Then,

Time-adjusted discounted reward based on forecast is:

$$r'_{ij} = \begin{cases} 0, & t = -1 \\ r_{ij}\lambda^t, & t \geq 0 \end{cases}$$

The reward that is calculated just based on agents' current availability, i.e. without using any forecast/predictive models, can be considered as a special case of the generalized expression above:

$$\lambda = \begin{cases} 1, & t = 0 \\ 0, & \text{otherwise} \end{cases}$$

$$r'_{ij} = \begin{cases} 0, & t = -1 \text{ or } t > 0 \\ r_{ij}, & t = 0 \end{cases}$$

While the above reward function favors shorter wait time, one may define the objective function such that aspects like abandonments, agent idle time, etc. are factored in.

In the above toy example, assume that agent A2 is currently on a call, and the alternate reward maximization module 108 predicts that he will be freed up in the next time tick that is within the customer's patience threshold. Such prediction of when the agent is to become available may be based, for example, on analysis of estimated handling times for the call intent type. Other algorithms for forecasting agent availability may also be invoked to predict when the agent it to become available. In such a scenario, with λ set to 0.9, the assignment using availability forecast models may be as shown in FIG. 13.

As seen from FIG. 13, one may note that at t=0, while even though A1 fetches more reward handling Report_Fault, the algorithm assigns Enquire_Bill anticipating A2's availability in the next time tick since A2 obtains significantly greater reward handling Report_Fault.

Figure 10:
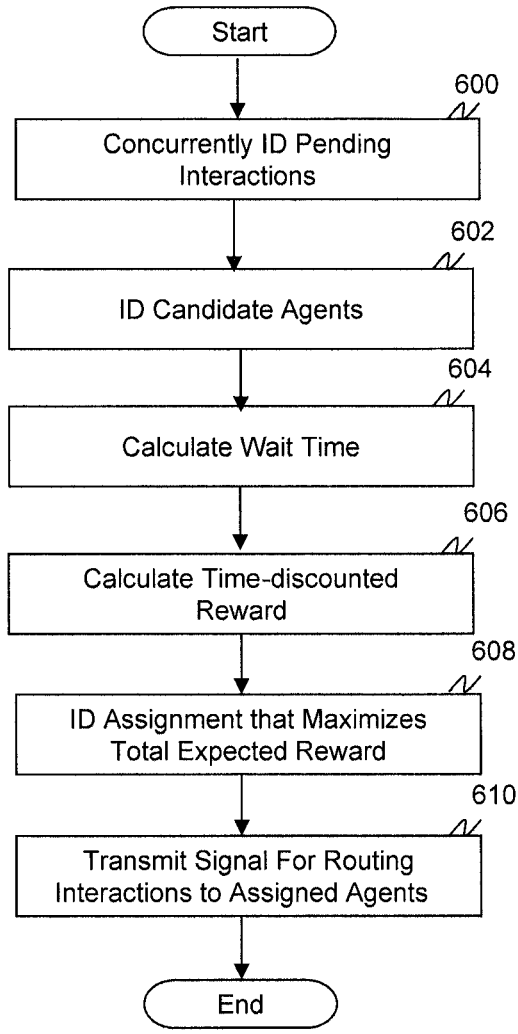
FIG. 10 is a flow diagram of a process for finding an optimal assignment of agents for multiple interactions at the same time according to ne embodiment of the invention.

FIG. 10 is a flow diagram of a process for finding an optimal assignment of agents for multiple interactions at the same time according to ne embodiment of the invention. In this regard, assuming that the 2-step approach still applies, the agent filtering module 100, in act 600, concurrently identifies two or more interactions that are waiting to be routed (e.g. all interactions pending at time=0). In act 602, the agent filtering module 100 filters agents for the two or more interactions based on hard constraints, and returns a set of candidate agents to the alternate reward maximization module 108. According to one embodiment, current availability of an agent is not a hard constraint that needs to be met by the filtering module in order to be considered as a candidate agent. That is, an agent that possesses the skills for handling one or more of the interactions may be returned as a potential candidate even if that agent is not currently available.

In act 604, the module 108 proceeds to calculate a predicted wait time associated with each of the candidate agents. According to one embodiment, the predicted wait time is based on the agent's current status and the threshold customer patience for the identified interaction intent type. The agent's current status may include information on whether the agent is available or not to handle the interaction. If the agent is not currently available, the current status may include information on the interaction that he is currently handling, such as interaction type, intent identified for the interaction, handling time, and the like. According to one embodiment, the wait time is set to be 0 if the agent is currently available, and set to be -1 if the agent is currently busy and not expected to be available until after a time that the caller is predicted to abandon the interaction. For other cases, the wait time is a function of the predicted availability of the agent.

In act 606, the module 108 calculates, for each interaction and each candidate agent, a time-discounted reward that is expected to be achieved by assigning the interaction to the agent. According to one embodiment, the time-discounted reward value is calculated using the algorithms that are used by the reward maximization module 102. In one embodiment, the algorithm selects an upper confidence bound of the expected reward. Unlike the reward calculated by the reward maximization module 102, however, the alternate reward maximization module 108 discounts the upper confidence bound of the expected reward based on a discount factor. In this regard, the discount factor gives more importance to rewards that are to be achieved earlier rather than later in time. According to one embodiment, the discount factor is a value that is computed as a function of the wait time. For example, the smaller the wait time, the smaller the discount factor value. If the agent is immediately available, the expected reward computed for that agent is not discounted. On the other hand, if the interaction is likely to be abandoned before the agent becomes available (e.g. the time the agent is predicted to become available is longer than the time that the customer is predicted to hold prior to abandoning the interaction, or in other words, the wait time exceeds a predicted customer patience threshold), the expected reward is calculated to be 0.

In act 608, the module 108 finds an optimal assignment for the interactions based on the time-discounted rewards.

In act 610, the module 108 transmits signals to cause, for example, the switch/media gateway 12, to route the various interactions to the agent devices based on the assignment in act 608.

Agent Preferences and Bidding

Referring again to FIG. 2, another data-driven optimization module for finding an optimal match of an interaction to an agent is the agent bidding module 104. The agent bidding module 104 is configured to satisfy preferences of agents in routing interactions. According to one embodiment, the bidding module 104 may take the set of candidate agents provided by the agent filtering module 100, and generate a routing offer to one or more of the candidate agents based on matched preferences. The routing offer may present a bidding opportunity to the offered agent. Each offered agent may respond with a bid for handling the interaction. One or more rounds of biddings may take place until the call is successfully matched to a single agent.

Figure 9:
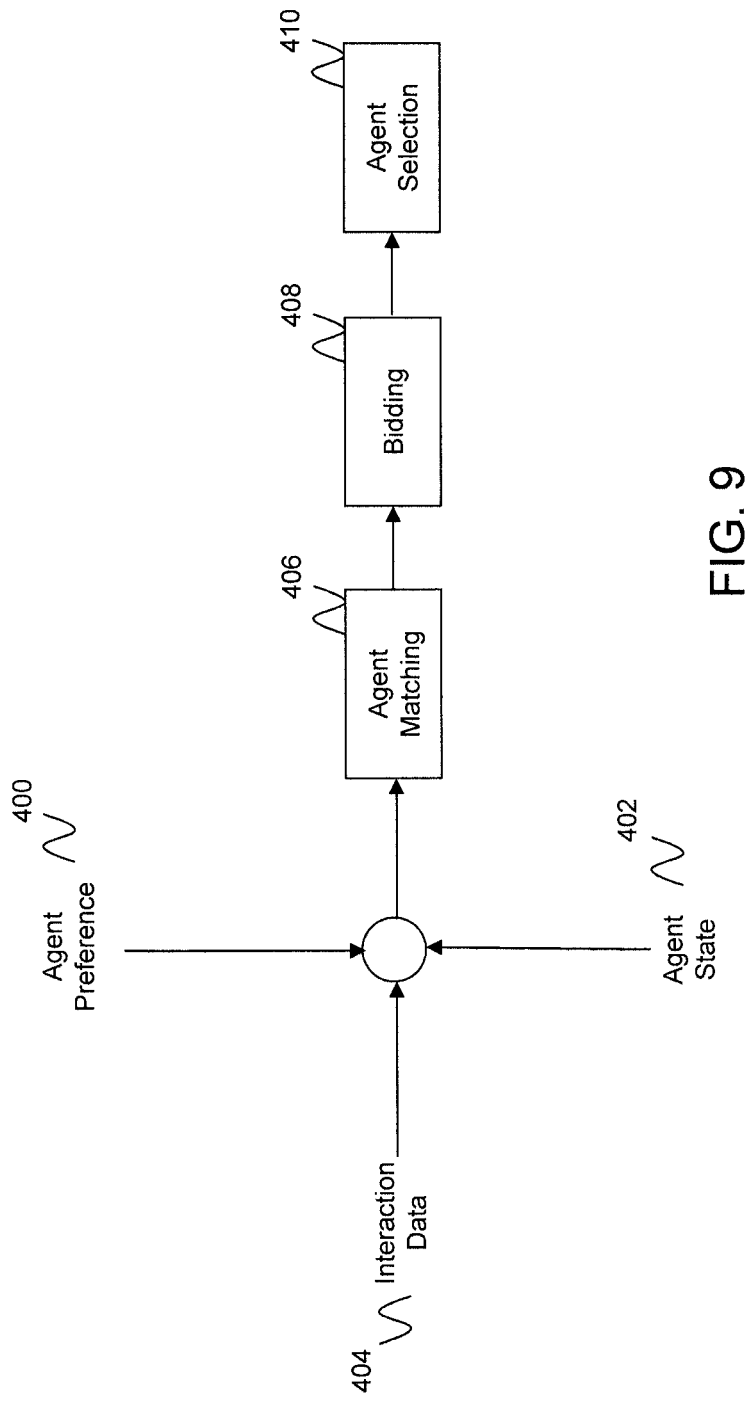
FIG. 9 is schematic layout diagram of an agent bidding module according to one embodiment of the invention.

FIG. 9 is schematic layout diagram of the agent bidding module 104 according to one embodiment of the invention. The agent bidding module 104 includes an agent matching function for further reducing the candidate agents produced by the agent filtering module 100. The matching may be done, for example, based on agent preference data 400, agent state data 402, interaction data 404, and the like. In this regard, the agent matching function 406 is configured identify agents with preferences and states that match, or are deemed to be suitable, for a particular type of interaction.

According to one embodiment, the suitability of a match is based on the context of the interaction provided by the interaction data 404. The interaction data 404 may be gathered, for example, by the call server 18 or interaction server 25. For example, when a telephony call arrives at the switch/media gateway 12, the call server 18 proceeds to generate a call object with details on the incoming call, such as, for example, the called number, calling number, wait time, and the like. As the customer interacts with the system, interaction details are tracked and added to the call object. For example, data provided to the IMR 34 (e.g. reason for the call) may be captured and stored in the call object. Other interaction details that may be obtained from customer profile records and/or interaction records stored, for example, in the mass storage device 30. Such records may provide additional data about the customer and his/her prior interactions, such as, for example, customer segment data, unresolved interactions, statistics of prior interactions, and the like. According to one embodiment, where available, the interaction details include the same or similar attributes that may be made available to agents for being set as being preferred by the agents.

According to one embodiment, similar to how agents are labeled with attributes, the agent bidding module 104 may be further configured to extend the tagging of skills and attributes to customers and customer interactions. For example, attributes such as language fluency, agreeability, or a combination of evaluations provided by a customer may give indication to the bidding process and bidding agents on the desirability of an interaction. In this regard, customers may provide preferences of agents that they want via, for example, during an IVR interaction, customer preference profiles, and the like. The data may be provided explicitly or implicitly. For example, preference of agents by the customers may be inferred based on previous interactions that the customers have had with the same or different agents.

The agent preferences 400 considered for matching interactions to agents may be static and/or dynamic preferences. For example, the agent may mark a particular customer intent (e.g. billing inquiry), agent skill (e.g. chat), and/or any other attribute about the interaction or customer (e.g. calls that have been waiting for a particular amount of time), as being preferred. Agents may also indicate preferences for new criteria that already available in the system, based on, for example, anticipation of the criteria being relevant in the future. According to one embodiment, the agent preferences are expressed with time bounds/limits that indicate a time limit for which a particular marked attribute is to remain as being preferred (e.g. next 30 minutes after which the preference expires). Additional details on how agent preferences may be taken into account to route different types of contact center activity is found in U.S. application Ser. No. 13/681,420, filed on Nov. 19, 2012, entitled "System and Method for Contact Center Activity Routing based on Agent Preferences," the content of which is incorporated herein by reference.

According to one embodiment, agent preference and/or state data is input via a graphical user interface accessible to the agent via the agent device 38. For example, in setting the agent's preferences, the agent may invoke a preset drop down list of attributes that may be selected by the agent as being preferred. Selection of a particular attribute by the agent may cause the particular attribute to be marked (visually or otherwise), as being preferred. According to one embodiment, agents may mark a skill as being preferred through self-assessment of his/her skill level. For example, an agent may, after handling calls of a particular call type/intent, believe that certain expertise has been gained in the particular call type/intent and mark preference for skills relating to the particular call type/intent.

According to one embodiment, the ability of the agent to mark a skill as preferred may be limited based on validation from, for example, other agents or supervisors. The endorsements may also be used to add new skills to the drop down list of attributes that the agent may select to mark as being preferred. In some embodiments, a degree or level of preference may also be set (e.g. a value from 1 to 5), along with a time attribute indicative of the amount of time in which the preference is to be set.

According to one embodiment, agent preferences are stored statically as part of the agent profile in the mass storage device 30. In this regard, the preference data is set offline (e.g. when the agent is not scheduled to be working), and stored as the agent profile for retrieval when the agent is logged-in for work. The preferences may also be set dynamically by the agent as the agent handles interactions throughout a workday. For example, if an agent that is currently handling interactions of a particular type would like to handle interactions of a different type, the agent may indicate preference for the other interaction type via the agent device. The agent preference may be honored in real time, such as, for example, for a next interaction to be routed to the agent.

In regards to the agent state 402 which is also considered by the bidding module 104 for matching interactions to agents, biological/physiological characteristics of the agent may be monitored for automatically setting the agent state 402. For example, a device worn by the agent may monitor certain physical/biological attributes of the agent in real time to deduce the current physical or emotional state of the agent. The wearable device may be a watch, headset, or the like. The wearable device may be configured to monitor the agent's heartrate to determine whether the agent is agitated, tired, and the like. The wearable device may also be configured to monitor the agent's speech, typing speed, and the like, to deduce physical or emotional attributes of the user. In this regard, a speech analytics engine may capture and analyze the agent's voice in real time to deduce the agent's state relating to his/her mood/emotion. For example, the speech analytics engine may be configured to monitor for utterance of certain sounds or words, monitor the number of words uttered per minute, and/or the like, to assign an emotional and/or patience score to the agent. In another example, a typing speed of the agent captured and analyzed by a typing analytics engine may indicate a typing speed of less than an average by a threshold amount, leading to a conclusion that the agent is tired. Of course, although the use of wearable devices have been described, a person of skill in the art should recognize that non-wearable devices may also be used to detect a current agent state as will be appreciated by a person of skill in the art.

The gathered data on the agent preference 400, state 402, and interaction data 404 is input to the agent matching function 406. According to one embodiment, the agent matching function 406 is configured to filter out agents output by the agent filtering module 100 that do not satisfy a set match score. The match score may be based on the number of attributes that are listed in the interaction data 404 that are deemed to be preferred by the agent. The match score may also be based on the agent state 402 for filtering out agents that are in a state that may be deemed to be incompatible or detrimental for handling the current interaction. According to one embodiment, all or only agents with a certain match score, are then output to a bidding function 408.

According to one embodiment, an algorithm such as the reward estimation algorithm of the reward estimation module 306 is invoked for finding an agent with preferences and states that match a particular interaction. In this regard, additional inputs to be considered by the reward estimation function 306 for running the algorithm include the agent state 402 and agent preference 400. According to this embodiment, the reward to be maximized by the algorithm may be an agent satisfaction value. The more an interaction matches a preference of an agent, the higher should the agent satisfaction value be. In invoking the reward estimation algorithm, the agent matching function 406 may be configured to select several agents with rewards within a particular threshold instead of a single agent with the highest upper confidence bound.

Another way to incorporate the functionalities of the reward maximization module 102 or the alternate reward maximization module 108 with the agent bidding module may be to have the list of candidate agents returned by the filtering module 100 in the first step, to be further filtered based on agent preferences and/or agent acceptance of bid offers as discussed herein.

The bidding function 408 is configured to invite one or more of the agents identified by the agent matching function 406, to make a bid for the interaction. In this regard, the bidding function 408 transmits a routing/bidding offer/invitation to the one or more of the agents. The routing offer includes information about the interaction for agents to review and place their bids. The information may be all or portion of the interaction data 404 such as, for example, data relating to intent, customer category/segment, average wait time (AWT), previous average handle time, and the like. The bid may be placed by the agent in response to the received routing/bidding offer. In this regard, the bidding function 408 may be configured to transmit the routing/bidding offer to the agent device 38 for each matched agent. The offer may be configured to be displayed on each agent device 38 for a set period of time, such as, for example, as a pop-up message. During this set period of time, the agent may place a bid to handle the interaction by, for example, selecting an option on the invitation (e.g. an "accept" button). If the agent does not interact with the invitation to place a bid, the offer is configured to expire and disappear.

According to one embodiment, the agent bidding module 104 may be configured to further augment the bidding process based on "currency" or "points" (collectively referred to as points). In this regard, the bidding function 408 may be configured to analyze and assign a bidding point to the current interaction based on, for example, a value or reward to be attained for handling the interaction, complexity of the interaction, disposition of the customer, and/or the like. For example, a first interaction that may result in closing a bigger deal than a second interaction may be assigned bidding points that may be bigger than the bidding points assigned to the second interaction. In another example, a first interaction from a customer that provided a low NPS score in the past may be assigned a bigger bidding point than a second interaction because the first interaction may be anticipated to be a difficult one. The actual accrual of the bidding points may be based on how successfully the interaction was handled by the agent. For example, a customer satisfaction score higher than a threshold score may result in the agent accruing all bidding points.

According to one embodiment, agents may have a limited amount of bidding points that may help them prevail in the selection process. For example, the accumulated bidding points may be used to win a bid for a particular type of interaction in case there is a tie with another agent bidding for the same interaction. In this regard, in addition to accumulating points based on prior interactions handled by the agent, points may be given by, for example, a supervisor, as an incentive or reward for the agent. The points may also be awarded as an incentive based on agent seniority or call closure rating in that each success (for example high satisfaction rate) would yield a number of currency points. The agent's choices when given bid options, can be used to further refine labeling of the attributes captured so far. This input can be used as a static input in the future with some expiration horizon.

Acceptances of routing/bidding offers/invitations are forwarded to an agent selection function 410 for selecting a single agent to which the current interaction is to be routed. In this regard, an agent to first submit a bid is selected as the agent to whom the interaction is to be routed. In another embodiment, the selection may be based on optimization across concurrent assignments of multiple interactions to a group of agents, as is described in U.S. application Ser. No. 13/681,417, filed on Nov. 19, 2012, entitled "Best Match Interaction Set Routing," the content of which is incorporated herein by reference.

In the event of a bidding tie where two or more agents concurrently place a bid, the agent selection function 408 may include an algorithm for breaking the tie. For example, the algorithm may be configured to consider pre-set optimization criteria such as, for example, training goals, cost, and the like. According to one embodiment, an optimization algorithm, such as, for example, the Hungarian algorithm described in more detail in http://en.wikipedia.org/wiki/Hungarian_algorithm, the content of which is incorporated herein by reference, may be used to optimize the routing of a particular interaction to concurrently bidding agents based on set optimization criteria. For example, the algorithm may choose the agent that needs more real-life training on a particular topic in the event of a tie with another agent who has a lesser need for such training. Tie breakers may also be based on points accumulated by agents. For example, an agent with a higher number of accumulated points may win the bid over an agent with a lower number of points.

According to one embodiment, if the current bidding round does not result in a selection of an agent, another round of bidding may be initiated by the bidding module 408. In one example, the number of agents to whom bid offers are sent may be expanded to include agents that may be below an initial threshold match score.

Agent/Customer Social Network

Referring again to FIG. 2, a yet further data-driven optimization module for finding an optimal match of an interaction with an agent is the agent/customer social network module 106. In this regard, the matching of agents to customers may be put in a framework of a social network of customers and agents. The agents and customers are nodes or vertices of the network. A connection may be made between an agent and a customer when an interaction for the customer is routed to the agent. In one embodiment, a connection is also made based on knowledge of agent and/or customer preferences as described in further detail in U.S. application Ser. No. 12/910,179, entitled "System for Rating Agents and Customers for Use in Profile Compatibility Routing," filed on Oct. 22, 2010, the content of which is incorporated herein by reference. For example, a connection may be made between a customer and an agent in response to the customer providing a positive rating of a prior interaction with the agent. According to one embodiment, social and behavioral profiles (also referred to as features) of both agents and customers are used for making the connection. The connections are represented via edges or links in the network. The profiles may be maintained in association with the nodes.

The nodes may be assigned different attributes, such as, for example, social and behavioral attributes, which may be stored in the corresponding profiles. In addition, the edges themselves may have values or weights that may capture information about the nature of the relationship between the nodes they connect. For example, the edge between a customer and each agent node may be formed if there is a certain level of "fit" between the customer and each agent. Such "fit" determination may be based on, for example, the customer's interactions with the IMR server 34, the customer's interactions with the enterprises' website, social media interactions of the customer, feedback received after the customer interacts with an agent (e.g. customer survey responses, NPS scores, agent ratings, etc.), interaction outcome, customer/agent preference information, features of the customers/agents, and the like. The features of the customers/agents that may be considered for determining "fit" may be similar to the customer profile (cp) and agent profile (ap and/or a) considered by the reward maximization module 102. Analysis of such profile data may indicate a level of compatibility between the customer associated with the interaction that is to be routed, and each candidate agent. For example, an assumption may be made that the more the profile of an agent overlaps with the profile of a customer, the better the match or fit between the customer and the agent. The amount of overlap may be determined based on which and how many attributes are shared by the customer and the agent (e.g. the agent and the customer went to the same school, live in the same area, have same hobbies, have the same nationality, have same kind of pets, etc.). Certain attributes may be weighed higher than other attributes in calculating the amount of overlap.

Other features of the customer and candidate agents that may be considered for determining fit during the second pass may relate to their behavioral profile. The behavioral profile may be, for example, real time behavioral status of the agents and customer that may be captured in a way similar to the way agent state 402 is captured by the agent bidding module 104 (e.g. via a speech analytics module). For example, a customer that is sensed to be upset may be deemed to be a better fit for an agent identified to have a high patience score. In this regard, when it comes to behavioral profile, the module 106 may not always look for shared behaviors, but instead, look for compatible behaviors. The compatibility of behaviors may be based on preset rules accessible to the module 106. For example, upset behavior of a customer may be deemed to be compatible with a high patience score of an agent.

One or more of the factors considered for determining "fit" may each be represented as a separate edge the connects the customer node to the corresponding agent node. For example, a separate "agent rating" link may be provided to connect a particular customer to a particular agent to represent an average of all ratings received by the agent after an interaction with the customer. Such value may be obtained via a post contact survey upon completion of each interaction. In addition, if there is no express survey, but the agent indicates to the system that the interaction was overall positive, a "customer satisfaction" link may be updated with a value that depicts positive customer satisfaction from the particular customer. Other edges and associated values/weights may also be maintained and updated for a particular customer/agent pair, such as, for example, a "rewards" link that provides an average of all reward values achieved during interactions between the agent and the customer, a "profile match" link that provides a value indicative of how well the agent's profile matches the customer's profile, and other links that may considered to determine a general "fit" between the agent and the customer.

As a new customer interacts with the contact center for the first time, there may be no initial preference for any particular agent aside from, for example, preference data gathered by the reward maximization module 102 and/or agent bidding module 104. That is, the new customer may not be represented initially in the network of agents and customers. Even if a customer is not new, in a large contact center where a customer interacts with a limited number of agents, there may be no data on past interactions with a majority of the agents in the contact center. Hence the value/weight of an edge from the customer node to any agent node may be the same (e.g. all have a value of 1). In many situations, however, preference information may be deduced based on feature information on the customer that may be extracted prior to the customer being routed to an agent. Certain customer features may be extracted, for example, based on the customer's current location, responses to prompts provided by the IMR server 34, audio emotion analysis, intent analysis and the like. A fit between the customer and each agent may then be predicted based on the extracted customer's features, and an agent predicted to be the best fit selected for routing the customer to the agent. According to one embodiment, the predicted fit is based on an expected reward to be achieved during the interaction. The expected reward may be calculated, for example, by the reward maximization module 102.

In one example, the module 106 may even tap into information derived from public social networks for determining the fit between an agent and a customer. Such public social networks may be general (e.g. Facebook) or specialized (e.g. network for biking enthusiasts). If there is a strong link between an agent and a particular customer in the agent-customer social network (e.g. they are immediate friends on Facebook, or within 2 or 3 degrees of separation), an assumption may be made that the agent is also close to persons who are close to this customer in other social networks.

According to one embodiment, a fit between the customer and each agent may be predicted based on predicting the sentiment that is likely to result if an interaction from the customer were to be routed to the agent. In this regard, the agent/customer social network module 106 may be configured to analyze audio recordings, text transcripts, emails, SMS messages, chat transcripts, and the like, of past interactions for all customers, for identifying key phrases such as "thank you, you've helped me very much," "you have been a great help," and other words that express desired or undesired states or qualities of the interaction, as explicit sentiment information. Sentiment information may also be obtained from post-interaction surveys where customers provide explicit ratings such as, for example, agent ratings, NPS scores, survey scores, and the like. Even without an explicit survey score, if the customer explicitly signals that he likes a particular agent (e.g. the customer marks an agent as "favorite"), this may be taken as an explicit indication of positive sentiment for the agent, as is s described in further detail in U.S. application Ser. No. 14/201,648 filed on Mar. 7, 2014, entitled "Conversation Assistant," the content of which is incorporated herein by reference.

According to one embodiment, the agent/customer social network module 106 is configured to take the gathered data (e.g. indications and ratings) from the past interactions for all customers, and conduct sentiment analysis for each interaction. In this regard, the module 106 is configured to run a sentiment analysis algorithm for determining sentiment for each of the past interactions from the gathered data. The algorithm may include instructions for part of speech tagging, extracting text relevant to opinions expressed by the customer on desired or undesired states or qualities of the interaction, and the like. The module 106 may then apply supervised learning techniques conventional in the art to classify the interactions as having, for example, positive or negative sentiment. In this regard, the algorithm may be configured to tag the interaction with a sentiment tag based on the sentiment analysis. The tag may be, for example, a numeric value, graphical depiction (stars, thumbs up or down), or any other label (e.g. "good" or "bad") indicative of positive or negative sentiment, and/or a level of such sentiment. For example, if a numeric value is used, a value of "1" may indicate that the customer disliked interacting with the agent, while a value of "5" may indicate that the customer really liked interacting with the agent.

Once the prior interactions have been analyzed for sentiment, the agent/customer social network module 106 may generalize or extend the analysis to predict a sentiment for a current interaction between a particular customer and a particular agent. The generalization may utilize collaborative filtering or deep neural network. For collaborative filtering, the module 106 seeks to find other customers that are like-minded (e.g. share similar attributes) and have similar taste in agents as the current customer for whom sentiment is to be predicted. For deep neural network, the input to the network may be features that represent customer properties and agent properties, and the output is a predicted sentiment. According to one embodiment the deep neural network is trained based on customer and agent properties in past interactions that resulted in particular sentiments. In general terms, the customer and agent properties are correlated to particular sentiments during the training/learning stage. The learned properties of the agents and customers may then be extended to the current interaction to predict sentiment for the current interaction. The customer attributes that may be considered include but are not limited to age, gender, education level, income level, location, and the like. The agent attributes that may be considered include but are not limited to age, gender, education level, years on the job, and location.

As the customer interacts with a particular agent, and that interaction results in a positive or negative experience, the weight of the edge(s) may be modified from the learned experience. According to one embodiment, the weight of the general "fit" edge (and/or a more specific "customer experience" edge) between the customer node and the agent node is increased if the interaction results in a positive experience, but decreased if the interaction results in a negative experience. The amount of the increase or decrease may be based, for example, on the actual reward achieved during the interaction. The amount of increase or decrease may also be based on values provided by the customer during a post-interaction survey, and/or other feedback received from the customer or agent after the interaction.

According to one embodiment, instead or in addition to weights assigned to the edges connecting an agent and a customer, a distance between the particular customer node and the particular agent node may be manipulated so that the better fit between an agent and a customer, the closer the nodes will appear in the graph that is displayed to visualize the social network, while the worse the fit, the further the nodes will appear.

According to one embodiment, in determining which one of various candidate agents provided by the agent filtering module should be selected as the optimal agent, the agent/customer social network module 106 considers the features of the particular customer, the profile of the candidate agents, and/or weights or distances of edges between the particular customer node and the candidate agent nodes. According to one embodiment, the agent/customer social network module 106 executes a classification algorithm for recommending one or more of the candidate agents for handling the current interaction based on analysis of the agent/customer social network. According to one embodiment, the recommended candidate agents are predicted to have the best fit with the customer.

According to one embodiment, agents that are believed to be a good fit with the particular customer may be prioritized for selection during the second pass as opposed to other candidate agents.

According to one embodiment, a customer's preference for a particular agent may be exposed to other customers in the social network allowing those other customers to follow suit and also express preference for the particular agent. In this regard, the agent/customer social network module provides a graphical user interface accessible to customers for exposing their preference data to other customers. For example, a particular customer may share or expose preference for a particular agent (e.g. via a thumbs up indicator or an assigned rank value), to the customer's friends on a social network (e.g. the customer's Facebook™ friends). In yet another example, even if the particular customer has not expressly exposed his preference for a particular agent, the agent/customer social network module may be configured to take into account such preference data in selecting agents for a friend of the particular customer.

In embodiments where the agent/customer social network module 106 is used in conjunction with other optimization modules such as, for example, the reward maximization module 102 and/or agent bidding module 104, the determination of fit between agents and customers may be done before or after selection of optimal agents by these other modules to find overlapping agents that are deemed optimal by module 106 as well as one or more of the other modules.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, switches, gateways, engines, and/or modules (collectively referred to as servers) in the afore-described figures is a process or thread, running on one or more processors, in one or more computing devices 1500 (e.g., FIG. 9A, FIG. 9B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 11A:
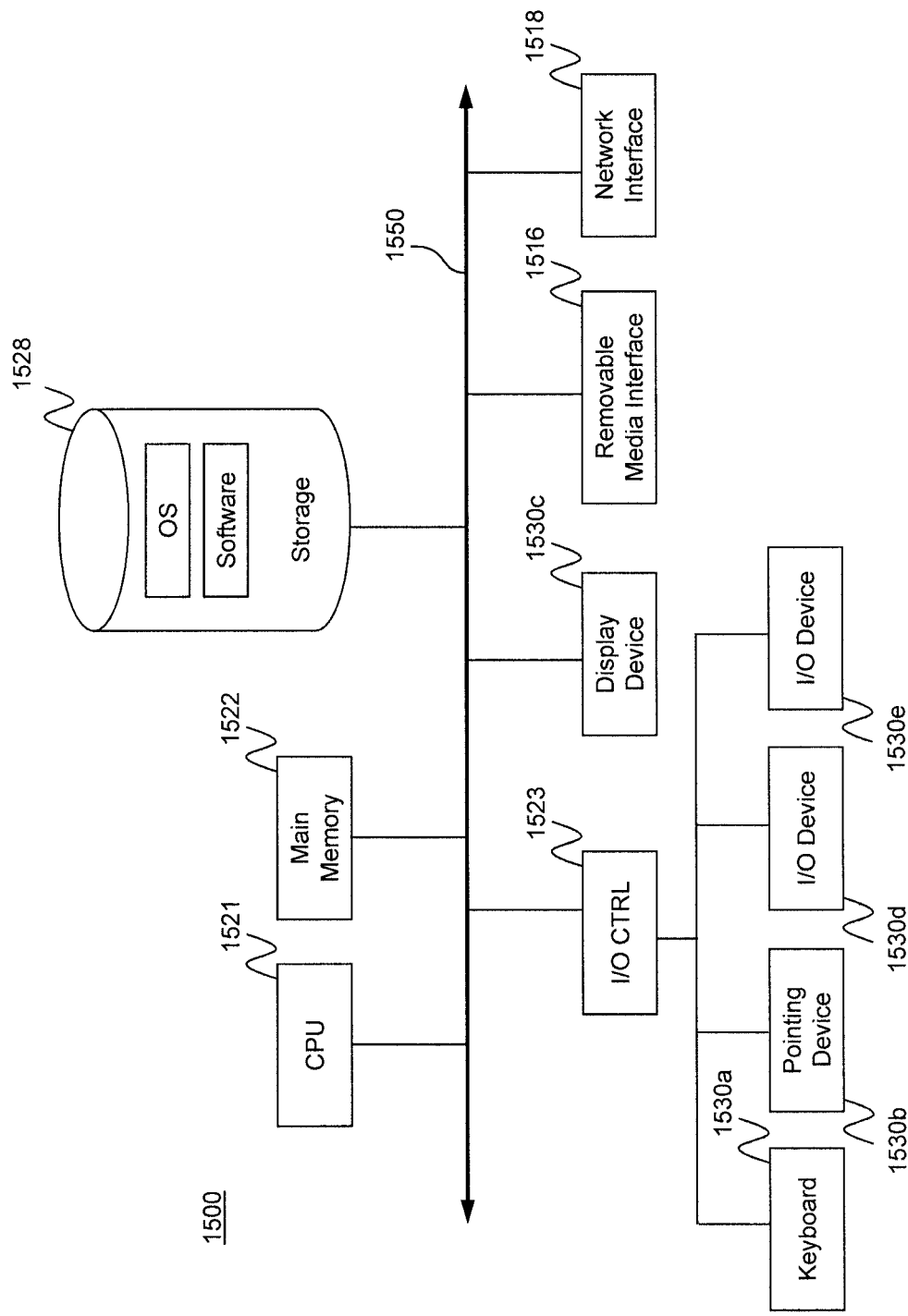
FIG. 11A is a block diagram of a computing device according to an embodiment of the present invention.
Figure 11B:
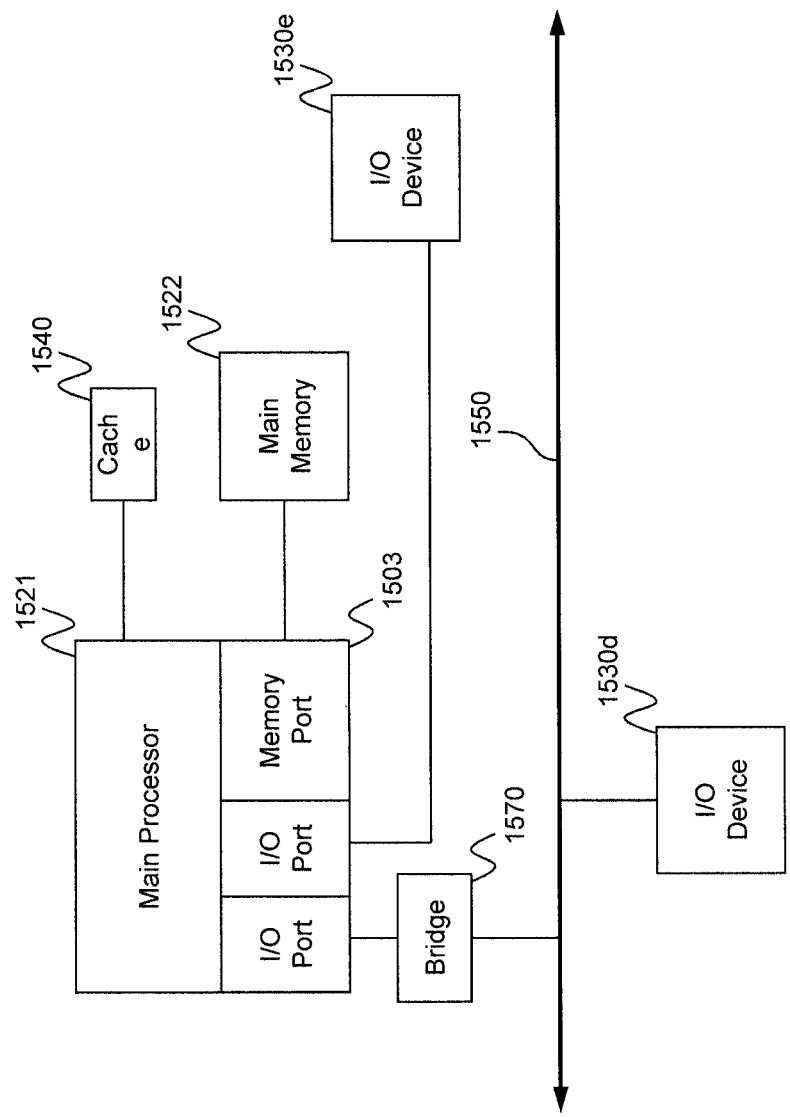
FIG. 11B is a block diagram of a computing device according to an embodiment of the present invention.

FIG. 11A and FIG. 11B depict block diagrams of a computing device 1500 as may be employed in exemplary embodiments of the present invention. Each computing device 1500 includes a central processing unit 1521 and a main memory unit 1522. As shown in FIG. 11A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 11B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 11A, the central processing unit 1521 communicates with the main memory 1522 via a system bus 1550. As shown in FIG. 11B, the central processing unit 1521 may also communicate directly with the main memory 1522 via a memory port 1503.

FIG. 11B depicts an embodiment in which the central processing unit 1521 communicates directly with cache memory 1540 via a secondary bus, sometimes referred to as backside bus. In other embodiments, the central processing unit 1521 communicates with the cache memory 1540 using the system bus 1550. The cache memory 1540 typically has a faster response time than main memory 1522. As shown in FIG. 11A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 11B depicts an embodiment of a computer 1500 in which the central processing unit 1521 communicates directly with I/O device 1530e. FIG. 11B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 11A, may control the I/O devices. The I/O controller may control one or more I/O devices such as a keyboard 1530a and a pointing device 1530b, e.g., a mouse or optical pen.

Referring again to FIG. 11A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 11A and FIG. 11B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 11D:
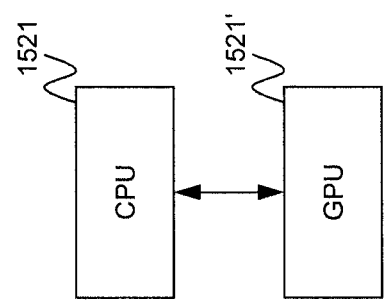
FIG. 11D is a block diagram of a computing device according to an embodiment of the present invention.
Figure 11C:
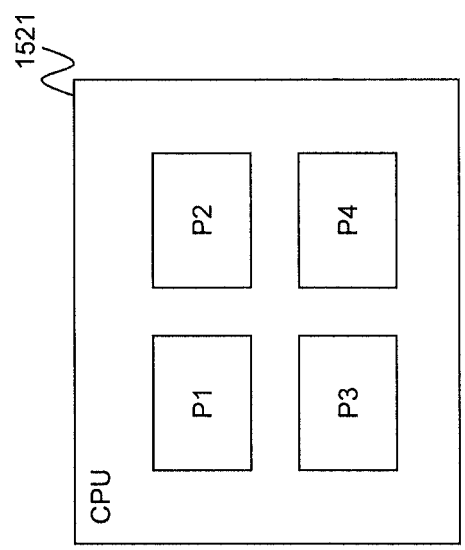
FIG. 11C is a block diagram of a computing device according to an embodiment of the present invention.

As shown in FIG. 11C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 11D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 11E:
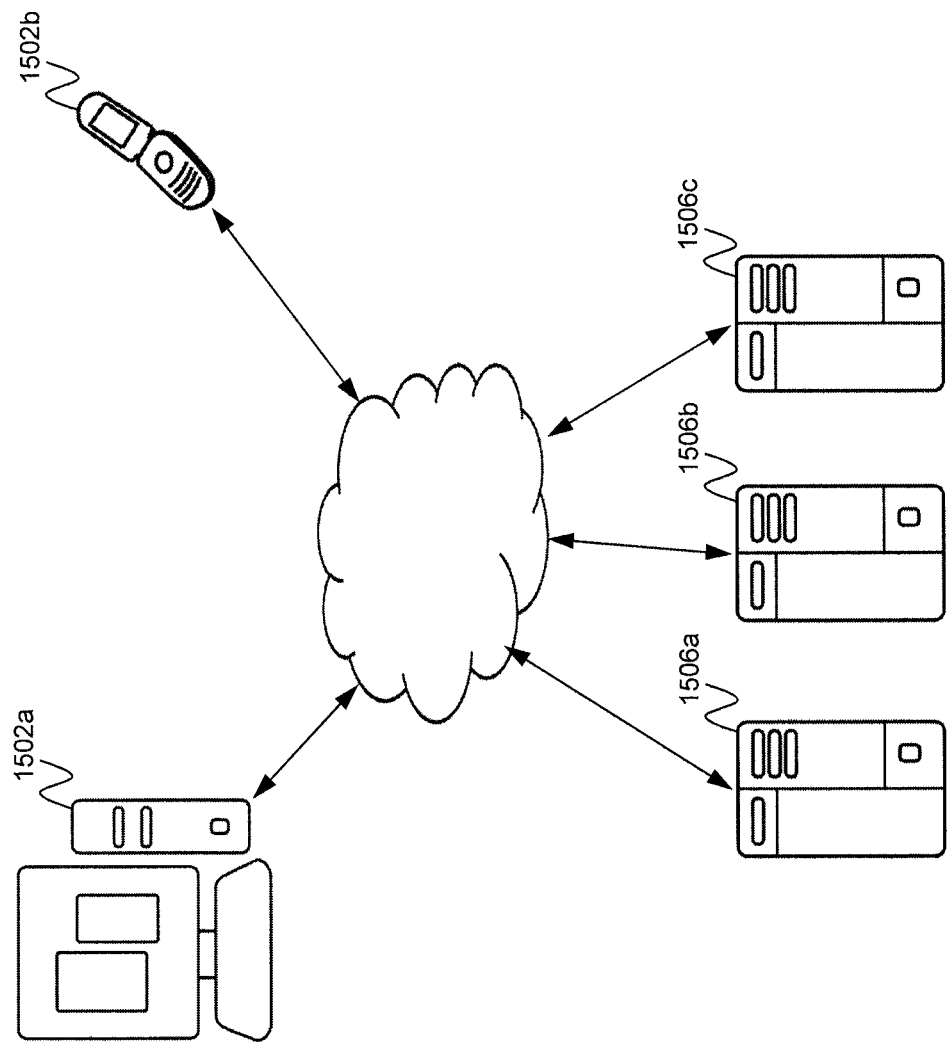
FIG. 11E is a block diagram of a network environment including several computing devices according to an embodiment of the present invention.

A computing device may be one of a plurality of machines connected by a network, or it may comprise a plurality of machines so connected. FIG. 11E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 11E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 11E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiments which in no way depart from the scope and spirit of the present invention. For example, instead of routing of a single interaction to a single agent in a sequential manner, the embodiments could be extended to concurrent routing/assignment of multiple interactions to multiple agents. Furthermore, to those skilled in the various arts, the invention itself herein will suggest solutions to other tasks and adaptations for other applications. For example, although the above embodiments have mainly been described in terms of routing inbound interactions, a person of skill in the art should appreciate that the embodiments may also be applied during an outbound campaign to select outbound calls/customers to which an agent is to be assigned. Thus, for example, the reward maximization module 102 may rate customers based on their profiles and assign a specific agent to one of the calls/customers that is expected to maximize a reward (e.g. sales). Thus, the present embodiments of the invention should be considered in all respects as illustrative and not restrictive.

The invention claimed is:

1. A system for routing interactions to contact center agents, the system comprising:
   a processor; and
   a memory, wherein the memory has stored therein instructions that, when executed by the processor, cause the processor to:
   identify an interaction to be routed;
   identify a group of agents based on one or more constraints for generating one or more candidate agents;
   gather context data surrounding the candidate agents;
   for each agent of the candidate agents, estimate an expected value to be obtained by routing the interaction to the agent;
   select, based on the estimates, a particular agent of the candidate agents that does not have a highest expected value from among the candidate agents; and
   signal a routing device for routing the interaction to the particular agent.

2. The system of claim 1, wherein the one or more constraints are skills for handling the plurality of interactions.

3. The system of claim 1, wherein the expected value is calculated based on profile of the candidate agents, profile of a customer associated with the interaction, and intent of the interaction.

4. The system of claim 3, wherein the profile of each of the candidate agents includes a dynamically added skill, wherein the dynamically added skill is ignored or mapped to another skill, for calculating the expected value.

5. The system of claim 3, wherein a proficiency level is associated with a skill, wherein the proficiency level is adjusted based on analysis of call transfers for each of the candidate agents.

6. The system of claim 3, wherein the profile of the candidate agents includes preference of each of the agents in handling the interaction, wherein the instructions further cause the processor to:

generate a routing offer to one or more of the candidate agents based on the preference of the corresponding agents.

7. The system of claim 6, wherein the candidate agents and customers associated with a plurality of interactions are modeled as a network of agents and customers, wherein a connection between a node representing one of the candidate agents and a node representing one of the customers is indicative of a fit between the one of the candidate agents and the one of the customers.

8. The system of claim 7, wherein the instructions that cause the processor to select the particular agent further include instructions that cause the processor to determine how well a customer associated with the interaction to be routed fits with the particular agent.

9. The system of claim 8, wherein the instructions that cause the processor to determine how well the customer fits with the particular agent further include instructions that cause the processor to predict sentiment to be expected during the interaction between the customer and the particular agent.

10. The system of claim 1, wherein the expected value is modeled as a standard normal distribution with an upper confidence bound, and the instructions that cause the processor to select the particular agent cause the processor to select an agent associated with an expected value with a highest upper confidence bound.

11. The system of claim 10, wherein the selection of the agent associated with the highest upper confidence bound balances exploration and exploitation needs.

12. The system of claim 11, wherein the exploration needs are satisfied by selecting agents that are deemed sub-optimal, and exploitation needs are satisfied by selecting agents that maximize expected values.

13. The system of claim 1, wherein the instructions that cause the processor to select the particular agent include instructions that cause the processor to:

concurrently identify a plurality of interactions waiting to be routed, wherein the plurality of interactions include the interaction to be routed; and select contact center agents for the plurality of interactions.

14. The system of claim 13 further comprising:

estimate the expected value to be obtained for routing each of the plurality of interactions to each of the contact center agents.

15. The system of claim 14 further comprising:

calculate a predicted wait time associated with each of the contact center agents, wherein the expected value for a particular one of the contact center agents is a function of the predicted wait time for the particular one of the plurality of agents.

16. The system of claim 1, wherein the interactions are real-time interactions.

* * * * *